(12) United States Patent
Choi et al.

(10) Patent No.: US 10,290,861 B2
(45) Date of Patent: May 14, 2019

(54) COMPOSITE POSITIVE ACTIVE MATERIAL, METHOD OF PREPARING THE SAME, POSITIVE ELECTRODE INCLUDING THE COMPOSITE POSITIVE ACTIVE MATERIAL, AND LITHIUM BATTERY INCLUDING THE POSITIVE ELECTRODE

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Byungjin Choi, Seoul (KR); Andrei Kapylou, Yongin-si (KR); Donghan Kim, Suwon-si (KR); Jinhwan Park, Seoul (KR); Jayhyok Song, Yongin-si (KR); Sungjin Ahn, Anyang-si (KR); Donghee Yeon, Seoul (KR); Byongyong Yu, Yongin-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 78 days.

(21) Appl. No.: 15/161,759

(22) Filed: May 23, 2016

(65) Prior Publication Data
US 2017/0179470 A1   Jun. 22, 2017

(30) Foreign Application Priority Data
Dec. 18, 2015  (KR) .................. 10-2015-0181856

(51) Int. Cl.
*H01M 4/36* (2006.01)
*H01M 4/00* (2006.01)
(Continued)

(52) U.S. Cl.
CPC ......... *H01M 4/364* (2013.01); *H01M 4/0471* (2013.01); *H01M 4/505* (2013.01);
(Continued)

(58) Field of Classification Search
CPC .... H01M 4/364; H01M 4/0471; H01M 4/505; H01M 4/525; H01M 4/623; H01M 4/625; H01M 10/0525; H01M 2004/028
(Continued)

(56) References Cited

U.S. PATENT DOCUMENTS 9,083,044 B2   7/2015  Kim et al.
2004/0201948 A1 * 10/2004 Hosoya ............... H01M 4/131
                                                  361/305
(Continued)

FOREIGN PATENT DOCUMENTS

JP    2011134670 A    7/2011
KR   101215829 B1   12/2012
(Continued)

OTHER PUBLICATIONS

Zheng et al., "Role of Mn content on the Electrochemical Properties of Nickel-Rich Layered LiNi0.8—xMn0.1+xo2 (0.0<x<0.08) Cathodes for Lithium-ion Batteries", Applied Materials& Interfaces, vol. 7, 2015, pp. 6926-6934.

*Primary Examiner* — Harold Y Pyon
*Assistant Examiner* — Danny N Kang
(74) *Attorney, Agent, or Firm* — Cantor Colburn LLP

(57) ABSTRACT

A composite positive active material includes: a composite including a first metal oxide represented by Formula 1 and having a layered structure, and a second metal oxide having at least one crystal structure selected from a layer structure, a perovskite structure, a rock salt structure, and a spinel structure, wherein a content of the second metal oxide is greater than 0 and equal to or less than 0.2 moles, per mole of the composite, $$\text{LiNi}_x\text{M}^1{}_{1-x}\text{O}_{2-e}\text{M}^2{}_e \qquad \text{Formula 1}$$

wherein, in Formula 1, $M^1$ is at least one element selected from Group 4 to Group 14 of the Periodic Table of the Elements; $M^a$ is at least one element selected from F, S, Cl, and Br; $0.7 \leq x < 1$; and $0 \leq e < 1$. Also, a positive electrode including the composite positive active material, and a lithium battery including the positive electrode.

25 Claims, 13 Drawing Sheets

(51) Int. Cl.
*H01M 4/04* (2006.01)
*H01M 4/505* (2010.01)
*H01M 4/525* (2010.01)
*H01M 4/62* (2006.01)
*H01M 10/0525* (2010.01)
*H01M 4/02* (2006.01)

(52) U.S. Cl.
CPC ........... *H01M 4/525* (2013.01); *H01M 4/623* (2013.01); *H01M 4/625* (2013.01); *H01M 10/0525* (2013.01); *H01M 2004/028* (2013.01)

(58) Field of Classification Search
USPC ....................................................... 252/500
See application file for complete search history.

(56) References Cited

U.S. PATENT DOCUMENTS

| | | |
|---|---|---|
| 2012/0040247 A1 | 2/2012 | Manivannan et al. |
| 2013/0228718 A1* | 9/2013 | Lee ..................... H01M 4/131 |
| | | 252/182.1 |
| 2013/0252107 A1 | 9/2013 | Lee et al. |
| 2013/0299735 A1 | 11/2013 | Chung et al. |
| 2015/0349339 A1 | 12/2015 | Cho et al. |

FOREIGN PATENT DOCUMENTS

| | | |
|---|---|---|
| KR | 101319376 B1 | 10/2013 |
| KR | 20130125124 A | 11/2013 |
| KR | 101382797 B1 | 4/2014 |
| KR | 101475922 B1 | 12/2014 |
| KR | 101551520 B1 | 9/2015 |
| WO | 2015006957 A1 | 1/2015 |
| WO | 2015019483 A1 | 2/2015 |

\* cited by examiner

COMPOSITE POSITIVE ACTIVE MATERIAL, METHOD OF PREPARING THE SAME, POSITIVE ELECTRODE INCLUDING THE COMPOSITE POSITIVE ACTIVE MATERIAL, AND LITHIUM BATTERY INCLUDING THE POSITIVE ELECTRODE

CROSS-REFERENCE TO RELATED APPLICATION

This application claims the benefit of and priority to Korean Patent Application No. 10-2015-0181856, filed on Dec. 18, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to a composite active material, methods of preparing the same, a positive electrode including the composite active material, and a lithium battery including the positive electrode.

2. Description of the Related Art

Along with the use of lithium batteries as power sources for portable electronic devices and vehicles, vigorous research is in progress to improve the capacity of lithium batteries. The trends toward multifunctional and higher functional devices are increasing demand for smaller, lighter, and higher-voltage lithium batteries for use as power sources of such devices.

To implement lithium batteries satisfying such demands, there is a need for positive active materials with improved lifespan and capacity characteristics, and suppressed reduction in voltage characteristics even under repeated charging and discharging.

SUMMARY

Provided is a composite positive active material that is structurally stable under repeated charging and discharging, and a method of preparing the positive active material.

Provided is a positive electrode including the composite positive active material.

Provided is a lithium battery including the positive electrode.

Additional aspects will be set forth in part in the description which follows and, in part, will be apparent from the description, or may be learned by practice of the presented embodiments.

According to an aspect of an embodiment, a composite positive active material includes: a composite including a first metal oxide represented by Formula 1 and having a layered structure, and a second metal oxide having at least one crystal structure selected from a layered structure, a perovskite structure, a rock salt structure, and a spinel structure, wherein a content of the second metal oxide is greater than 0 and equal to or less than 0.2 moles, per mole of the composite, $$LiNi_xM^1{}_{1-x}O_{2-e}M'{}_e \qquad \text{Formula 1}$$

wherein, in Formula 1, $M^1$ is at least one element selected from Group 4 to Group 14 element of the Periodic Table of the Elements; $M^a$ is at least one element selected from F, S, Cl, and Br, $0.7 \leq x < 1$; and $0 \leq e < 1$.

According to an aspect of another embodiment, a method of preparing the composite positive active material includes: mixing a first metal oxide precursor represented by Formula 13, a lithium precursor, and a manganese precursor to prepare a composition for forming a composite positive active material; and thermally treating the composition for forming the composite positive active material to prepare the composite positive active material:

$$Ni_xM^1{}_{1-x}Q \qquad \text{Formula 13}$$

wherein, in Formula 13, $M^1$ is at least one element selected from Group 4 to Group 14 elements of the Periodic Table of the Elements, Q is —OH, —CO$_3$, or —(C$_2$O$_4$)—, and $0.7 \leq x < 1$.

According to an aspect of another embodiment, a positive electrode includes the composite positive active material.

According to an aspect of another embodiment, a lithium battery includes the positive electrode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
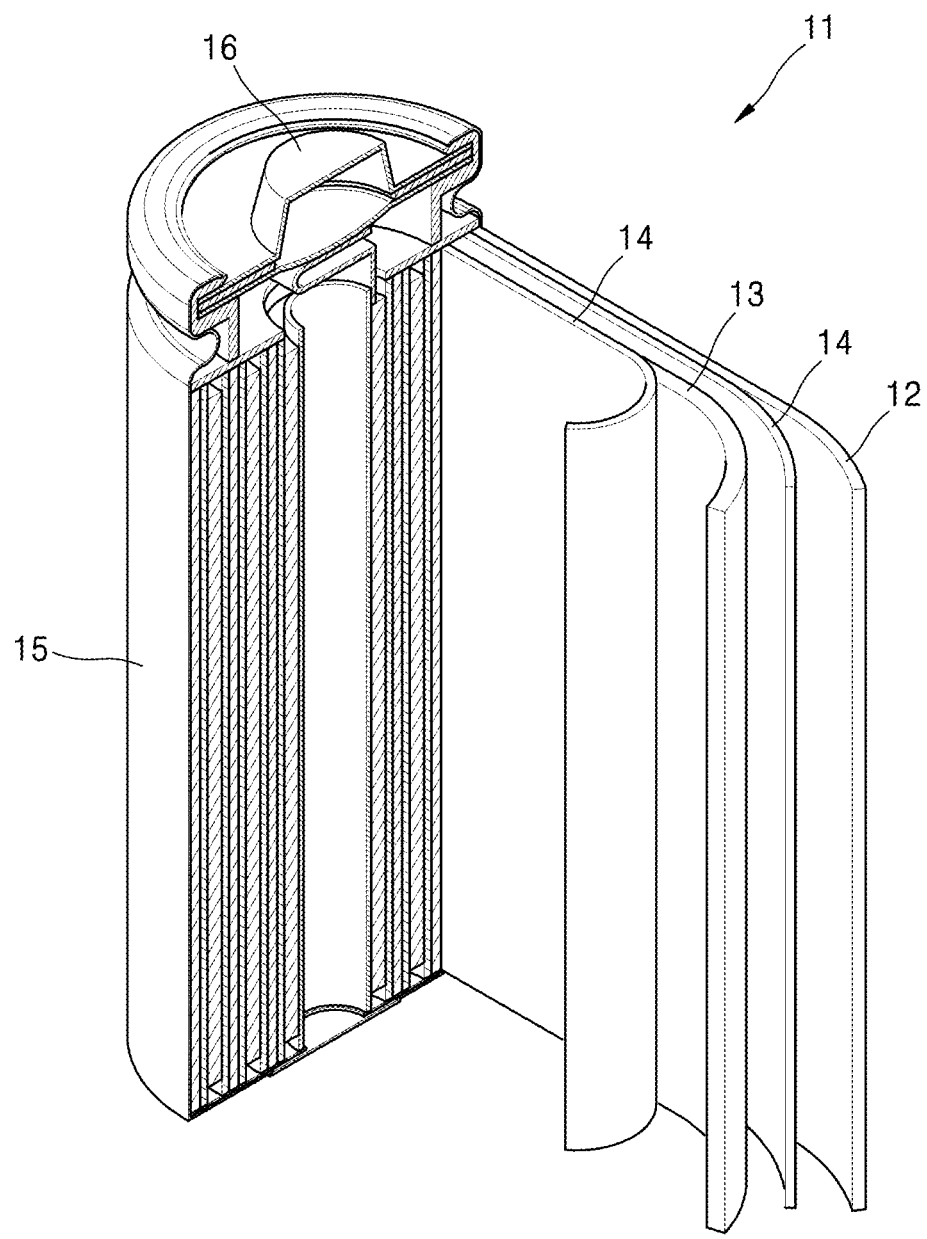
FIG. 1 is an exploded perspective view of a lithium battery according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. "Or means and/or." As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a composite positive active material, a method of preparing the composite positive active material, a positive electrode including the composite positive active material, and a lithium battery including the positive electrode will be disclosed in greater detail.

According to an aspect of the present disclosure, a composite positive active material includes: a first metal oxide represented by Formula 1 and having a layered structure; and a second metal oxide having at least one crystalline structure selected from a layered structure, a perovskite structure, a rock salt structure, and a spinel structure, wherein the first metal oxide and the second metal oxide form a composite, and wherein a content of the second metal oxide is greater than 0 and equal to or less than 0.2 moles, per mole of the composite, $$LiNi_xM^1_{1-x}O_{2-e}M^a_e \quad \text{Formula 1}$$

wherein, in Formula 1, $M^1$ is at least one element selected from Group 4 to Group 14 elements of the Periodic Table of the Elements; $M^a$ is at least one element selected from F, S, Cl, and Br; $0.7 \le x < 1$; and $0 \le e < 1$.

As used herein, the terms "mole fraction" refers to a ratio of a mole of the first metal oxide or the second metal oxide with respect to a total moles of the composite positive active material.

In some embodiments, a mole fraction of the first metal oxide in the composite positive active material may be equal to or greater than 0.7 and less than 1, equal to or greater than 0.8 and less than 1, or equal to or greater than 0.9 and less than 1.

If the mole fraction of the second metal oxide in the composite positive active material is greater than 0.2, the amount of residual lithium may be reduced, but a lithium battery having a positive electrode including the composite positive active material may have deteriorated cell performance, for example, in terms of capacity, conductivity, and cell output.

To manufacture a lithium battery with high power output and high capacity, there has been much research into the use of a lithium nickel oxide having high nickel content as a positive active material. However, the lithium nickel oxide having high nickel content may not have sufficient structural stability during charging and discharging, although it has improved capacity and power output characteristics, or satisfactory lifetime characteristics due to high residual lithium content. A battery including a lithium nickel oxide having a high nickel content may be prepared using a process of removing residual lithium.

Disclosed is a composite positive active material which can be used to provide a lithium battery with improved lifetime characteristics by introducing the second metal oxide as a secondary phase. While not wanting to be bound by theory, it is understood that inclusion of the second metal oxide as a secondary phase with the first metal oxide of Formula 1, which comprises a high nickel content of about 0.7 mole or more based on 1 mole of a total amount of a transition metal, provides a composite having improved structural stability during charging and discharging and may reduce the amount of residual lithium.

For example, the amount of residual lithium in the composite positive active material may be about 15,000 parts per million (ppm) or less, and in some embodiments, about 5,000ppm to about 14600 ppm, and in some other embodiments, about 9,810 ppm to about 14,571ppm, or about 11,000 ppm to about 13,000 ppm, based on a total amount of the composite positive active material. The amount of residual lithium is determined based on a total of the amount of lithium hydroxide (LiOH) and the amount of lithium carbonate ($Li_2CO_3$). For example, the amount of lithium hydroxide (LiOH) may be from about 0.3 weight percent (wt %) to about 0.9 wt %, and in some embodiments, about 0.446 wt % to about 0.866 wt %, or about 0.4 wt % to about 0.8 wt %. For example, the amount of lithium carbonate ($Li_2CO_3$) may be from about 0.45 wt % to about 0.6 wt %, for example, about 0.535 wt % to about 0.591wt %, or about 0.5 wt % to about 0.59 wt %.

In Formula 1, $M^1$ may include at least one metal selected from manganese (Mn), vanadium (V), chromium (Cr), iron (Fe), cobalt (Co), nickel (Ni), zirconium (Zr), rhenium (Re), aluminum (Al), boron (B), germanium (Ge), ruthenium (Ru), tin (Sn), titanium (Ti), niobium (Nb), molybdenum (Mo), and platinum (Pt).

For example, the first metal oxide of Formula 1 may be a compound represented by Formula 2.

$$LiNi_xCo_yMn_zM^3_cO_{2-e}M^a_e \qquad \text{Formula 2}$$

In Formula 2, 0.7≤x≤0.99; 0≤y<1; 0<z<1; 0≤c<1; 0<x+y+z+c≤1; 0≤e<1; $M^3$ may be at least one selected from Group 4 to Group 14 elements of the Periodic Table of the Elements; and $M^a$ may be an anionic element selected from F, S, Cl, and Br.

In some embodiments, in Formula 2, the amount of cobalt may be greater than the amount of manganese (i.e., y>z). When the amount of cobalt in Formula 2 is greater than the amount of manganese, a lithium battery having a positive electrode including the composite positive active material may have further improved conductivity and capacity characteristics.

For example, the first metal oxide of Formula 1 may be a compound represented by Formula 3

$$LiNi_xCo_yMn_zO_2 \qquad \text{Formula 3}$$

In Formula 3, 0.7≤x≤0.99; 0<y<1; 0<z<1; and 0<x+y+z≤1.

In some embodiments, the second metal oxide having at least one crystal structure selected from a layered structure, a perovskite structure, a rock salt structure, and a spinel structure may be a compound represented by Formula 4, a compound represented by Formula 5, a compound represented by Formula 6, or a compound represented by Formula 7, $$A_2M^2O_3 \qquad \text{Formula 4}$$

$$AM^2O_3 \qquad \text{Formula 5}$$

$$(A_bM^2_{1-b})O \qquad \text{Formula 6}$$

$$AM^2_2O_4 \qquad \text{Formula 7}$$

In Formulae 4 to 7, A may be at least one element selected from Group 1 to Group 3 elements of the Periodic Table of the Elements; $M^2$ may be at least one element selected from Group 2 to Group 16 elements and rare earth elements, and 0≤b≤1.

In Formulae 4 to 7, A may be at least one element selected from Li, Na, La, Sr, Ba, H, K, Ca, and Y; $M^2$ may be at least one element selected from Al, Ga, Ge, Mg, Nb, Zn, Cd, Ti, Co, Ni, Mn, Ca, Si, Fe, Cu, Sn, V, B, P, Se, Bi, As, Zr, Re, Ru, Cr, Sr, Sc, and Y.

The compound represented by Formula 4 may be a compound having a layered crystalline structure, for example, $Li_2MnO_3$, $Li_2TiO_3$, $Li_2SnO_3$, $Li_2ZrO_3$, $Li_2MoO_3$, or $Li_2RuO_3$.

The compound represented by Formula 5 may be a compound having a perovskite crystalline structure, for example, a compound represented by Formula 8.

$$(A^1_{1-a}A^2_a)M^1O \qquad \text{Formula 8}$$

In Formula 8, $A^1$ may be at least one metal selected from La, Sr, Ba, Ce, Y, and Sc; $A^2$ may be at least one selected from Li, Na, Ca, Ag, K, Mg, and Cu; $M^1$ may be at least one selected from Mn, V, Cr, Fe, Co, Ni, Zr, Ti, Mg, Cu, Nb, Ta, Ru, W, and Sn; and 0<a≤0.3.

For example, the compound represented by Formula 8 may be $LiMnO_3$, $(Li_{1-a}La_a)MnO_3$ (where 0<a≤0.3), $(Li_{1-a}Sr_a)MnO_3$ (where 0<a≤0.3), or $(Li_{1-a}Ba_a)MnO_3$ (where 0<a≤0.3).

The compound represented by Formula 6 may be a compound having a rock salt crystalline structure, for example, $(Li_bNi_{1-b})O$, $(Li_bCO_{1-b})O$, $(Li_bFe_{1-b})O$, $(Li_bCu_{1-b})O$, $(Li_bZn_{1-b})O$, $(Li_bCa_{1-b})O$, $(Li_bSr_{1-b})O$, $(Li_bMg_{1-b})O$, or $(Li_bCr_{1-b})O$, wherein 0≤b≤1.

The compound represented by Formula 7 may be a compound having a spinel crystalline structure, for example, $LiMn_2O_4$, $LiNi_{0.5}Mn_{1.5}O_4$, $LiCo_{0.5}Mn_{1.5}O_4$, $[Li][Co_fNi_gMn_h]_2O_4$, or $[Li][Cu_cMn_{2-c}]_2O_4$, wherein 0<c≤2, 0<f≤2, 0<g≤2, 0<h ≤2 and f+g+h=2.

The first metal oxide having a layered structure in the composite positive active material as described above may form a composite with the second metal oxide. For example, the composite positive active material may include the second metal oxide having a crystal phase of the C2/m space group and the first metal oxide having a crystal phase of the R-3m space group. The crystal phase of the C2/m space group may be Li$_2$MO$_3$, and the crystal phase of the R-3m space group may be LiNi$_x$M$^1_{1-x}$O$_{2-e}$M$^2_e$.

In some embodiments, the second metal oxide of the composite positive active material may be intermixed in the layered crystal structure of the first metal oxide.

In some embodiments, the composite positive active material may be at least one selected from compounds represented by Formulae 9 to 12.

$$(1-a)\text{LiNi}_x\text{M}^1_{1-x}\text{O}_2 \cdot a\text{A}_2\text{M}^2\text{O}_3 \quad \text{Formula 9}$$

$$(1-a)\text{LiNi}_x\text{M}^1_{1-x}\text{O}_2 \cdot a\text{AM}^2\text{O}_3 \quad \text{Formula 10}$$

$$(1-a)\text{LiNi}_x\text{M}^1_{1-x}\text{O}_2 \cdot a(\text{A}_b\text{M}^2_{1-b})\text{O}, \text{ and} \quad \text{Formula 11}$$

$$(1-a)\text{LiNi}_x\text{M}^1_{1-x}\text{O}_2 \cdot a\text{AM}^2_2\text{O}_4 \quad \text{Formula 12}$$

In Formulae 9 to 12, A may be at least one metal selected from Li, Na, La, Sr, Ba, H, K, Ca, and Y; M$^1$ may be at least one selected from Mn, V, Cr, Fe, Co, Zr, Ti, Mg, Cu, Nb, Ta, Ru, W, and Sn; M$^2$ may be at least one selected from Al, Ga, Ge, Mg, Nb, Zn, Cd, Ti, Co, Ni, Mn, Ca, Si, Fe, Cu, Sn, V, B, P, Se, Bi, As, Zr, Re, Ru, Cr, Sr, Sc, Y, and a rare earth element; and 0<a≤0.2, 0<b≤1.

For example, the composite positive active material may be at least one selected from compounds represented by Formulae 9-1 to 12-1.

$$(1-a)\text{LiNi}_x\text{Co}_y\text{Mn}_z\text{O}_2 \cdot a\text{Li}_2\text{MnO}_3, \quad \text{Formula 9-1}$$

$$(1-a)\text{LiNi}_x\text{Co}_y\text{Mn}_z\text{O}_2 \cdot a\text{LiMnO}_3, \quad \text{Formula 10-1}$$

$$(1-a)\text{LiNi}_x\text{Co}_y\text{Mn}_z\text{O}_2 \cdot a(\text{Li}_b\text{La}_{1-b})\text{MnO}_3, \quad \text{Formula 10-2}$$

$$(1-a)\text{LiNi}_x\text{Co}_y\text{Mn}_z\text{O}_2 \cdot a(\text{Li}_b\text{Ni}_{1-b})\text{O}, \quad \text{Formula 11-1}$$

$$(1-a)\text{LiNi}_x\text{Co}_y\text{Mn}_z\text{O}_2 \cdot a\text{LiMn}_2\text{O}_4, \quad \text{Formula 12-1}$$

In Formulae 9-1 to 12-1, 0.7≤x≤0.99; 0<y≤0.3; 0<z≤0.3; x+y+z=1; 0<b≤1, and 0<a≤0.2.

In Formulae 9-1 to 12-1, LiNi$_x$Co$_y$Mn$_z$O$_2$ may be LiNi$_{0.85}$Co$_{0.10}$Mn$_{0.05}$O$_2$, LiNi$_{0.8}$Co$_{0.1}$Mn$_{0.1}$O$_2$, LiNi$_{0.75}$Co$_{0.20}$Mn$_{0.05}$O$_2$, or LiNi$_{0.9}$Co$_{0.05}$Mn$_{0.05}$O$_2$.

In some embodiments, the composite positive active material may be at least one selected from 0.98LiNi$_{0.85}$Co$_{0.10}$Mn$_{0.05}$O$_2$·0.02Li$_2$MnO$_3$, 0.95LiNi$_{0.85}$Co$_{0.10}$Mn$_{0.05}$O$_2$·0.05Li$_2$MnO$_3$, 0.9LiNi$_{0.85}$Co$_{0.10}$Mn$_{0.05}$O$_2$·0.1Li$_2$MnO$_3$, 0.8LiNi$_{0.85}$Co$_{0.10}$Mn$_{0.05}$O$_2$·0.2Li$_2$MnO$_3$, 0.98LiNi$_{0.8}$Co$_{0.1}$Mn$_{0.1}$O$_2$·0.02Li$_2$MnO$_3$, 0.95LiNi$_{0.8}$Co$_{0.1}$Mn$_{0.1}$O$_2$·0.05Li$_2$MnO$_3$, 0.9LiNi$_{0.8}$Co$_{0.1}$Mn$_{0.1}$O$_2$·0.1Li$_2$MnO$_3$, 0.8LiNi$_{0.8}$Co$_{0.1}$Mn$_{0.1}$O$_2$·0.2Li$_2$MnO$_3$, 0.98LiNi$_{0.75}$Co$_{0.20}$Mn$_{0.05}$O$_2$·0.02Li$_2$MnO$_3$, 0.95LiNi$_{0.75}$Co$_{0.20}$Mn$_{0.05}$O$_2$·0.05Li$_2$MnO$_3$, 0.9LiNi$_{0.75}$Co$_{0.20}$Mn$_{0.05}$O$_2$·0.1Li$_2$MnO$_3$, 0.8LiNi$_{0.75}$Co$_{0.20}$Mn$_{0.05}$O$_2$·0.2Li$_2$MnO$_3$, 0.98LiNi$_{0.9}$Co$_{0.05}$Mn$_{0.05}$O$_2$·0.02Li$_2$MnO$_3$, 0.95LiNi$_{0.9}$Co$_{0.05}$Mn$_{0.05}$O$_2$·0.05Li$_2$MnO$_3$, 0.9LiNi$_{0.9}$Co$_{0.05}$Mn$_{0.05}$O$_2$·0.1Li$_2$MnO$_3$, and 0.8LiNi$_{0.9}$Co$_{0.05}$Mn$_{0.05}$O$_2$·0.2Li$_2$MnO$_3$.

The composition of a composite positive active material may be identified by X-ray diffraction analysis. In particular, a ratio of the first metal oxide of Formula 1 and the second metal oxide may be identified based on an intensity ratio of peaks from the first metal oxide and the second metal oxide.

In some embodiments, the composite positive active material represented by Formula 9-1 may have a diffraction peak at a 2 theta (2θ) value of about 18.5° to about 19.0°, as measured by X-ray diffraction with Cu—Kα radiation. The diffraction peak at a 2θ value of about 18.5° to about 19.0° may originate from the (003) plane of LiNi$_x$Co$_y$Mn$_z$O$_2$ in the layered structure of the composite positive active material.

In some embodiments, in the composite positive active material, a diffraction angle 2θ of (003) plane peak of LiNi$_x$Co$_y$Mn$_z$O$_2$ having maximum intensity may be shifted toward a lower angle, due to the introduction of the secondary phase.

In some embodiments, the second metal oxide of the composite positive active material may be disposed on the surface of the composite positive active material. The second metal oxide may be disposed on an entire surface of the composite positive active material, or may be disposed on a portion of the composite positive active material, such as about 1% to about 99%, or about 10% to about 90%, or about 50% to about 80% of a total surface area of the composite positive active material. Thus, the composite positive active material may have a surface including the second metal oxide. The composite positive active material may be prepared using a stepwise process, such as a melt impregnation process. The composite positive active material including the second metal oxide in a surface region thereof may exhibit an effect as if the surface of the first metal oxide is treated with the second metal oxide, and may include a reduced amount of lithium on the surface of the composite positive active material.

In some embodiments, the second metal oxide in the composite positive active material may have a concentration gradient. In some embodiments, the composite positive active material may have a concentration gradient of manganese (Mn). The composite positive active material may be prepared using a process in which the order of adding a manganese precursor is specifically selected to provide a concentration gradient of the second metal oxide and/or manganese.

In some embodiments, a half cell having a positive element including the composite positive active material and lithium metal as a counter electrode may have an average discharge voltage of about 92.5% to about 99.95% after a 50$^{th}$ charging and discharging cycle, with respect to the average discharge voltage after a 1$^{st}$ charging and discharging cycle. The composite positive active material may have a reduced average discharge voltage decay.

In some embodiments, the composite positive active material may have an average particle diameter of primary particles of about 100 nanometers (nm) to about 500 nm. For example, the composite positive active material may have an average particle diameter of primary particles of about 50 nm to about 1000 nm, or about 200 nm to about 400 nm, and an average particle diameter of secondary particles of about 0.5 micrometer (μm) to about 100 μm, about 1 μm to about 30 μm, or about 5 μm to about 20 μm.

When the composite positive active material has an average particle diameter within any of these ranges, a lithium battery having improved physical characteristics may be obtained using the composite positive active material.

In some embodiments, the composite positive active material may have a tap density of about 0.1 gram per cubic centimeter (g/cm$^3$) to about 10 g/cm$^3$, about 0.5 gram per cubic centimeter (g/cm$^3$) to about 3 g/cm$^3$, or about 1 gram per cubic centimeter (g/cm$^3$) to about 2.5 g/cm$^3$. A lithium battery having improved voltage and lifetime characteristics may be obtained using the composite positive active material having a tap density within this range.

The composite positive active material may further include a coating layer on the surface thereof. When the composite positive active material further includes a coating layer, a lithium battery with a positive electrode including the composite positive active material may have improved charge and discharge characteristics, lifespan characteristics, and improved high-voltage characteristics.

In some embodiments, the coating layer may include at least one selected from a conductive material, a metal oxide, and an inorganic fluoride.

The conductive material may be at least one selected from a carbonaceous material, a conductive polymer, indium tin oxide, $RuO_2$, and ZnO.

The carbonaceous material may be crystalline carbon, amorphous carbon, or a mixture thereof. The crystalline carbon may be graphite, such as natural graphite or artificial graphite, and may be amorphous, and may be in a plate, flake, spherical or fibrous form. The amorphous carbon may comprise at least one selected from a soft carbon (e.g., carbon sintered at a low temperature), hard carbon, mesophase pitch carbide, sintered coke, graphene, carbon black, fullerene soot, carbon nanotube, and carbon fiber. However, examples of the crystalline carbon and amorphous carbon are not limited thereto. Any appropriate material available in the art may be used.

Examples of the carbonaceous material may include carbon nanotubes, fullerene, graphene, and carbon fibers. Examples of the conductive polymer may include at least one selected from polyaniline, polythiophene, and polypyrrole.

The metal oxide may include, for example, at least one selected from silica ($SiO_2$), alumina ($Al_2O_3$), zirconium oxide ($ZrO_2$), and titanium oxide ($TiO_2$).

The inorganic fluoride may include at least one selected from $AlF_3$, $CsF$, $KF$, $LiF$, $NaF$, $RbF$, $TiF$, $AgF$, $AgF_2$, $BaF_2$, $CaF_2$, $CuF_2$, $CdF_2$, $FeF_2$, $HgF_2$, $Hg_2F_2$, $MnF_2$, $MgF_2$, $NiF_2$, $PbF_2$, $SnF_2$, $SrF_2$, $XeF_2$, $ZnF_2$, $AlF_3$, $BF_3$, $BiF_3$, $CeF_3$, $CrF_3$, $DyF_3$, $EuF_3$, $GaF_3$, $GdF_3$, $Fe_{F3}$, $HoF_3$, $InF_3$, $LaF_3$, $LuF_3$, $MnF_3$, $NdF_3$, $VOF_3$, $PrF_3$, $SbF_3$, $ScF_3$, $SmF_3$, $TbF_3$, $TiF_3$, $TmF_3$, $YF_3$, $YbF_3$, $TlF_3$, $CeF_4$, $GeF_4$, $HfF_4$, $SiF_4$, $SnF_4$, $TiF_4$, $VF_4$, $ZrF_4$, $NbF_5$, $SbF_5$, $TaF_5$, $BiF_5$, $MoF_6$, $ReF_6$, $SF_6$, and $WF_6$.

In some embodiments, the coating layer may include at least one compound of a coating element selected from oxide, hydroxide, oxyhydroxide, oxycarbonate, and hydroxycarbonate of the coating element. The compounds for the coating layer may be amorphous or crystalline. The coating element for the coating layer may comprise at least one selected from Sc, Y, Nb, Cr, Mo, W, Mn, Fe, B, In, C, Sb, La, Ce, Sm, Gd, Mg, Al, Co, K, Na, Ca, Si, Ti, V, Sn, Ge, Ga, B, As, and Zr. The coating layer may be formed by using any suitable method (e.g., a spray coating method, a dipping method, or the like) that does not adversely affect the physical properties of the positive active material when a compound of the coating element is used. Such methods of forming the coating layer would be apparent to one of ordinary skill in the art, and the details of which can be determined without undue experimentation, and thus, a further detailed description thereof is omitted herein for clarity.

In an embodiment, the coating layer may be a continuous layer or a discontinuous layer, and for example, may be in the form of an island.

Hereinafter, an embodiment of a method of preparing a composite positive active material is further disclosed.

The method of preparing a composite positive active material is not particularly limited, and may be performed using any suitable method, for example, a co-precipitation method or a solid-phase method.

First, the co-precipitation method will be described. When a composite positive active material is prepared using co-precipitation, the composite positive active material may have a uniform composition.

A first metal oxide precursor represented by Formula 13 may be mixed with a lithium precursor and a manganese precursor to obtain a mixture, followed by thermally treating the mixture to obtain a composite positive active material represented by Formula 4, $$Ni_xM^1_{1-x}Q \qquad \text{Formula 13}$$

wherein in Formula 13, $M^1$ may be at least one element selected from Group 4 to Group 14 of the Periodic Table of the Elements; Q may be at least one selected from —OH, —$CO_3$, and —($C_2O_4$); and $0.7 \le x < 1$. In an embodiment, —($C_2O_4$)— is an oxalate ligand, i.e., —OC(=O)C(=O)O—.

The first metal oxide precursor represented by Formula 13 may be at least one selected from a first metal hydroxide represented by Formula 13a, a first metal carbonate represented by Formula 14, and a first metal oxalate represented by Formula 15 or Formula 16.

$$Ni_xM^1_{1-x}OH \qquad \text{Formula 13a}$$

$$Ni_xM^1_{1-x}CO_3 \qquad \text{Formula 14}$$

$$Ni_xM^1_{1-x}(OC(=O)C(=O)O) \qquad \text{Formula 15}$$

$$Ni_xM^1_{1-x}(C_2O_4) \qquad \text{[Formula 16]}$$

In Formulae 13a, 14, 15, and 16, $M^1$ may be at least one element selected from Group 4 to Group 14 of the periodic table of elements; and $0.7 \le x < 1$.

Examples of the lithium precursor may include lithium carbonate ($Li_2CO_3$), lithium sulfate ($Li_2SO_4$), lithium nitrate ($LiNO_3$), and lithium hydroxide (LiOH). The lithium precursor may be stoichiometrically mixed with a metal compound represented by Formulae 13 to 16 to obtain a composite positive active material having a composition represented by Formula 9-1, 10-1, 11-1, or 12-1.

A suitable example of the manganese precursor may ensure melt impregnation into pores of the first metal oxide precursor through the thermal treatment without any remaining residue after the thermal treatment. For example, the manganese precursor may be at least one selected from manganese nitrate and manganese acetate. While not wanting to be bound by theory, using such a manganese precursor that does not generate any residue after the thermal treatment, unlike other manganese precursors, and ensures melt impregnation into pores of the first metal oxide precursor through the thermal treatment, may result in generation of a thermodynamically stable compound through reaction of lithium and manganese. The resulting thermodynamically stable compound may have different X-ray diffraction (XRD) characteristics from those of a first metal oxide including no secondary phase. Accordingly, the positive active material may include a reduced amount of lithium on the surface thereof, for example, about 15,000 ppm or less of the composite positive active material.

The thermal treatment may be performed under an oxidizing gas atmosphere, for example, in air or oxygen at about 750° C. to about 1200° C., and in some embodiments, about 800° C. to about 1000° C., or about 850° C. to about 950° C. and in some other embodiments, at about 900° C. When the thermal treatment temperature is within any of these ranges, a composite positive material including a reduced amount of residual lithium may be prepared.

The thermal treatment time may vary depending on thermal treatment temperature. For example, the thermal treatment time may be from about 5 minutes to about 20 hours.

During the thermal treatment, the manganese precursor may be melted and impregnated into pores of the first metal oxide precursor represented by Formula 13. The melt impregnation may enable the residual lithium in the first metal oxide precursor to react with manganese, thus to form a stable phase. As a result, the amount of lithium on the surface of the composite positive active material may be remarkably reduced.

The compounds represented by Formulae 13 to 15, as examples of the first metal oxide precursor, may each be mixed with a nickel precursor, a $M^1$ precursor, and a solvent to obtain a precursor mixture. The solvent may be water, a C1 to C20 alcohol, or the like. For example, the alcohol may be ethanol.

The amount of the solvent may be about 100 parts to about 4,000 parts by weight, about 200 parts to about 3,000 parts by weight, or about 400 parts to about 2,000 parts by weight, with respect to 100 parts by weight of a total weight of the nickel precursor and $M^1$ precursor. When the amount of the solvent is within this range, the exemplary first metal oxide precursors may each form a uniform mixture. The mixing may be performed, for example, at about 20° C. to about 80° C., and in some embodiments, about 40° C. to about 60° C.

The $M^1$ precursor may be, for example, a $M^1$ carbonate, a $M^1$ sulfate, a $M^1$ nitrate, or a $M^1$ chloride.

For example, the $M^1$ precursor may be a cobalt precursor or a manganese precursor. Non-limiting examples of the cobalt precursor are cobalt sulfate, cobalt nitrate, cobalt chloride, and cobalt acetate. Non-limiting examples of the manganese precursor are manganese sulfate, manganese nitrate, manganese chloride, manganese acetate, and manganese chloride.

The precursor mixture may then be mixed with a chelating agent and a pH-adjusting agent (e.g., a precipitating agent), followed by co-precipitation reaction to obtain a precipitate. The precipitate may be filtrated and thermally treated. The thermal treatment may be performed at about 40° C. to about 110° C., and in some embodiments, about 40° C. to about 80° C. When the thermal treatment temperature is within any of these ranges, the co-precipitation reaction may have improved reactivity.

The chelating agent may regulate the rate of the co-precipitation reaction at which the precipitate is formed. Non-limiting examples of the chelating agent are ammonium hydroxide ($NH_4OH$), and citric acid. The amount of the chelating agent may be the same as used in the art.

The pH-adjusting agent may control the pH of the precursor mixture to be about pH 6 to 13, for example, about pH 10.5 to about 12.5, or about pH 11 to about pH 12. Non-limiting examples of the pH-adjusting agent are ammonium hydroxide, sodium hydroxide (NaOH), sodium carbonate ($Na_2CO_3$), and sodium oxalate ($Na_2C_2O_4$).

The first metal oxide precursor of Formula 13 may be, for example, a compound represented by Formula 14.

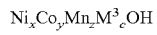    Formula 14 wherein, in Formula 14, 0.7≤x<1, 0<y≤0.3, 0<z≤0.3, 0≤c≤0.3, x+y+z+c=1, and $M^3$ may be at least one element selected from Group 4 to Group 14 of the Periodic Table of the Elements.

The compound represented by Formula 14 may be, for example, a compound represented by Formula 15.

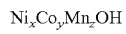    Formula 15

In Formula 15, 0.7≤x≤0.99, 0≤y≤0.3; 0≤z≤0.3, and x+y+z=1.

For example, the first metal oxide precursor may be $LiNi_{0.85}Co_{0.10}Mn_{0.05}OH$, $LiNi_{0.8}Co_{0.1}Mn_{0.1}OH$, $LiNi_{0.75}Co_{0.20}Mn_{0.05}OH$, or $LiNi_{0.9}Co_{0.05}Mn_{0.05}OH$.

In an embodiment, the composite positive active material may be prepared using a suitable preparation method known in the art, such as a solid-phase method or a spray pyrolysis process, in addition to the above-described co-precipitation method.

According to another aspect of the present disclosure, a positive electrode includes a composite positive active material.

According to another aspect of the present disclosure, a lithium battery includes the positive electrode.

A positive electrode according to an embodiment may be prepared according to the following method.

A positive active material, a binder, and a solvent may be mixed together to prepare a positive active material composition. A conducting agent may be further added to the positive active material composition.

The positive active material composition may be directly coated on a metal current collector and dried to form a positive electrode. Alternatively, the positive active material composition may be cast on a separate support to form a film, which may then be separated from the support and then laminated on a metal current collector, to thereby form a positive electrode.

The positive active material may be a composite positive active material according to any of the above-described embodiments.

The positive active material may further include a first positive active material which may be obtained commercially, in addition to the disclosed composite positive active material.

The first positive active material may include at least one selected from lithium cobalt oxide, lithium nickel cobalt manganese oxide, lithium nickel cobalt aluminum oxide, lithium iron phosphorus oxide, and lithium manganese oxide, but is not limited thereto. For example, the first positive active material may be any suitable positive active materials available in the art.

For example, the first positive active material may comprise a compound represented by the following formulae: $Li_aA_{1-b}B'_bD_2$ wherein 0.90≤a≤1.8 and 0≤b≤0.5; $Li_aE_{1-b}B'_bO_{2-c}D_c$ wherein 0.90≤a≤1.8, 0≤b≤0.5, and 0≤c≤0.05; $LiE_{2-b}B'_bO_{4-c}D_c$ wherein 0≤b≤0.5, and 0≤c≤0.05; $Li_aNi_{1-b-c}Co_bB'_cD_\alpha$ wherein 0.90≤a≤1.8, 0≤b≤0.5, 0≤c≤0.05, and 0<α≤2; $Li_aNi_{1-b-c}Co_bB'_cF_\alpha F''_\alpha$ wherein 0.90≤a≤1.8, 0≤b≤0.5, 0≤c≤0.05, and 0<α<2; $Li_aNi_{1-b-c}Co_bB'_cO_{2-\alpha}F''_\alpha$ wherein 0.90≤a≤1.8, 0≤b≤0.5, 0≤c≤0.05, and 0<α<2; $Li_aNi_{1-b-c}Mn_bB'_cD_\alpha$ wherein 0.90≤a≤1.8, 0≤b≤0.5, 0≤c≤0.05, and 0<α≤2; $Li_aNi_{1-b-c}Mn_bB'_cO_{2-\alpha}F''_\alpha$ wherein 0.90≤a≤1.8, 0≤b≤0.5, 0≤c≤0.05, and 0<α<2; $Li_aNi_{1-b-c}Mn_bB'_cO_{2-\alpha}F''_\alpha$ wherein 0.90≤a≤1.8, 0≤b≤0.5, 0≤c≤0.05, and 0<α<2; $Li_aNi_bE_cG_dO_2$ wherein 0.90≤a≤1.8, 0≤b≤0.9, 0≤c≤0.5, and 0.001≤d≤0.1; $Li_aNi_bCo_cMn_dGeO_2$ wherein 0.90≤a≤1.8, 0≤b≤0.9, 0≤c≤0.5, 0≤d≤0.5, and 0.001≤e≤0.1; $Li_aNiG_bO_2$ wherein 0.90≤a≤1.8, and 0.001≤b≤0.1; $Li_aCoG_bO_2$ wherein 0.90≤a≤1.8 and 0.001≤b≤0.1; $Li_aMnG_bO_2$ wherein 0.90≤a≤1.8 and 0.001≤b≤0.1; $Li_aMn_2G_bO_4$ wherein 0.90≤a≤1.8 and 0.001≤b≤0.1; $QO_2$; $QS_2$; $LiQS_2$; $V_2O_5$; $LiV_2O_5$; $LiI'O_2$; $LiNiVO_4$; $Li_{(3-f)}J_2(PO_4)_3$ wherein 0≤f≤2; $Li_{(3-f)}Fe_2(PO_4)_3$ wherein 0≤f≤2; and $LiFePO_4$.

In the formulae above, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or a combination thereof; F may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

For example, the first positive active material may comprise a compound represented by Formulae 17 to 19.

$$Li_aNi_bCO_cMn_dO_2 \qquad \text{Formula 17}$$

n Formula 17, $0.90 \leq a \leq 1.8$, $0 \leq b \leq 0.9$, $0 \leq c \leq 0.5$, and $0 \leq d \leq 0.9$.

$$Li_2MnO_3 \qquad \text{Formula 18}$$

$$LiMO_2 \qquad \text{Formula 19}$$

In Formula 19, M may be Mn, Fe, Co, or Ni.

Non-limiting examples of the conducting agent in the positive active material composition are carbon black, natural graphite, artificial graphite, acetylene black, ketjen black, carbon fibers, carbon nanotubes; metallic materials, including copper, nickel, aluminum, silver, or the like, in powder, fiber, or tubular form; and conductive polymers such as polyphenylene derivatives. Any suitable conducting agent available in the art may be used.

Non-limiting examples of the binder are a vinylidene fluoride/hexafluoropropylene copolymer, polyvinylidene fluoride (PVDF), polyimide, polyethylene, polyester, polyacrylonitrile, polymethylmethacrylate, polytetrafluoroethylene (PTFE), a carboxymethyl cellulose-styrene-butadiene rubber (SMC/SBR) copolymer, a styrene-butadiene rubber polymer, or a mixture thereof.

Non-limiting examples of the solvent include N-methylpyrrolidone (NMP), acetone, and water. Any suitable solvent available in the art may be used.

The amounts of the composite positive active material, the conducting agent, the binder, and the solvent may be determined by one of skill in the art of manufacture of lithium batteries without undue experimentation. At least one of the conducting agent, the binder, and the solvent may be omitted depending on the use and the structure of the lithium battery.

A negative electrode of the lithium battery according to an embodiment may be manufactured in substantially the same manner as in the manufacture of the positive electrode, except for using a negative active material instead of a positive active material.

The negative active material may be a carbonaceous material, silicon, a silicon oxide, a silicon-based alloy, a silicon-carbonaceous material composite, tin, a tin-based alloy, a tin-carbon composite, a metal oxide, or a combination thereof.

The carbonaceous material may comprise crystalline carbon, amorphous carbon, or a mixture thereof. The crystalline carbon may be graphite, such as natural graphite or artificial graphite that are in amorphous, plate, flake, spherical or fibrous form. The amorphous carbon may be soft carbon (carbon sintered at low temperatures), hard carbon, mesophase pitch carbides, sintered cokes, graphene, carbon black, fullerene soot, carbon nanotubes, and carbon fibers. Any appropriate material available in the art may be used.

The negative active material may be selected from Si, $SiO_x$ where $0<x<2$, for example, $0.5<x<1.5$, Sn, $SnO_2$, a silicon-containing metal alloy, and a mixture thereof. The metal that is alloyable with silicon may be at least one selected from Al, Sn, Ag, Fe, Bi, Mg, Zn, In, Ge, Pb, and Ti.

The negative active material may include a metal/metalloid alloyable with lithium, an alloy thereof, or an oxide thereof. Examples of the metal/metalloid alloyable with lithium are Si, Sn, Al, Ge, Pb, Bi, Sb, a Si—Y' alloy (where Y' is an alkali metal, an alkaline earth metal, a Group 13 element, a Group 14 element, a transition metal, a rare earth element, or a combination thereof except for Si), a Sn—Y" alloy (where Y" is an alkali metal, an alkaline earth metal, a Group 13 element, a Group 14 element, a transition metal, a rare earth element, or a combination thereof except for Sn), and $MnO_x$ where $0<x\leq2$. Y' and Y" may each independently be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or combinations thereof. Non-limiting examples of the oxide of the metal/metalloid alloyable with lithium are a lithium titanium oxide, a vanadium oxide, a lithium vanadium oxide, $SnO_2$, and $SiO_x$ where $0<x<2$.

For example, the negative active material may include at least one element selected from the elements of Groups 13, 14, and 15 of the Periodic Table of the Elements.

For example, the negative active material may include at least one element selected from Si, Ge, and Sn.

The amounts of the negative active material, the conducting agent, the binder, and the solvent may be those levels as used in the manufacture of lithium batteries in the art. Examples of the conducting agent, binder, and solvent for the negative electrode may be the same as those used in the manufacture of the positive electrode.

A separator may be disposed between the positive electrode and the negative electrode of the lithium battery. For example, the separator may be an insulating thin film having high ion permeability and high mechanical strength.

The separator may have a pore diameter of about 0.005 μm to about 30 μm, about 0.01 μm to about 10 μm, or about 0.1 μm to about 5 μm, and a thickness of about 1 μm to about 40 μm, about 5 μm to about 20 μm, or about 8 μm to about 15 μm. Non-limiting examples of the separator are olefin-based polymers, such as polypropylene, and sheets or nonwoven fabric made of glass fiber or polyethylene. When a lithium battery includes a solid polymer electrolyte, the solid polymer electrolyte may also serve as the separator.

The separator may comprise a monolayer or a multilayer separator including at least two layers of polyethylene, polypropylene, polyvinylidene fluoride, or a combination thereof. The multilayer separator may be a mixed multilayer separator. For example, the separator may be a two-layered separator including polyethylene and polypropylene layers, a three-layered separator including polyethylene, polypropylene and polyethylene layers, or a three-layered separator including polypropylene, polyethylene, and polypropylene layers.

The lithium salt-containing nonaqueous electrolyte may include a nonaqueous electrolyte and a lithium salt.

The nonaqueous electrolyte may be a nonaqueous liquid electrolyte, an organic solid electrolyte, or an inorganic solid electrolyte.

The nonaqueous liquid electrolyte may include an organic solvent. The organic solvent may be any suitable organic solvents available in the art. For example, the organic solvent may comprise at least one selected from propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, chloroethylene carbonate, benzonitrile, acetonitrile, tetrahydrofuran, 2-methyltetrahydrofuran, γ-butyrolactone, 1,3-dioxolane, 4-methyl-1,3-dioxolane, N,N-dimethyl formamide, N,N-dimethyl acetamide, dimethylsulfoxide, dioxane, 1,2-dimethoxyethane, sulforane, dichloroethane, chlorobenzene, nitrobenzene, diethylene glycol, and dimethyl ether.

Non-limiting examples of the organic solid electrolyte are polyethylene derivatives, polyethylene oxide derivatives, polypropylene oxide derivatives, phosphoric acid ester polymer, polyester sulfide, polyvinyl alcohol, polyvinylidene fluoride, and polymers including ionic-dissociative groups.

Non-limiting examples of the inorganic solid electrolyte are nitrides, halides, and sulfates of lithium, such as $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be a material that is soluble in a non-aqueous electrolyte, for example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ where x and y are natural numbers, $LiCl$, $LiI$, or a mixture thereof. To improve charge-discharge characteristics and resistance to flame in the lithium battery, pyridine, triethylphosphate, triethanolamine, cyclic ether, ethylene diamine, n-glyme, hexamethyl phosphoramide, nitrobenzene derivative, sulfur, a quinone imine dye, N-substituted oxazolidinone, N,N-substituted imidazolidine, ethylene glycol dialkyl ether, an ammonium salt, pyrrole, 2-methoxyethanol, or aluminum trichloride may be added to the nonaqueous electrolyte. In some embodiments, to provide nonflammable characteristics, a halogen-containing solvent such as carbon tetrachloride, ethylene trifluoride, or the like may be further added to the nonaqueous electrolyte, if required.

Referring to FIG. 1, a lithium battery 11 according to an embodiment of the present disclosure may include a positive electrode 13, a negative electrode 12, and a separator 14. The positive electrode 13, the negative electrode 12, and the separator 14 may be wound or folded, and then sealed in a battery case 15. Subsequently, the battery case 15 may be filled with an organic electrolyte and sealed with a cap assembly 16, thereby completing the manufacture of the lithium battery 11. The battery case 15 may be a cylindrical type, a rectangular type, or a thin-film type. For example, the lithium battery 11 may be a thin film type battery. The lithium battery 11 may be a lithium ion battery.

In some embodiments, a bi-cell structure as a stack of two battery assemblies may be formed and impregnated with an organic electrolyte. The resultant structure may then be put into a pouch and sealed, thereby completing the manufacture of a lithium ion polymer battery.

In some other embodiments, a plurality of battery assemblies may be stacked upon one another to form a battery pack, which may be used in any devices that operate at high temperatures and require high output, for example, in a laptop computer, a smart phone, an electric vehicle, and the like.

A lithium battery according to any of the above-described embodiments may have improved high-rate characteristics and lifespan characteristics, and thus may be applicable to an electric vehicle (EV), for example, in a hybrid vehicle such as a plug-in hybrid electric vehicle (PHEV).

An embodiment will now be described in further detail with reference to the following examples. However, these examples are only for illustrative purposes and are not intended to limit the scope of the present disclosure.

EXAMPLES

Preparation Example 1

Preparation of Composite Positive Active Material

A composite positive active material was synthesized using a co-precipitation method as follows.

A nickel sulfate, a cobalt sulfate, and a manganese sulfate as starting materials were stoichiometrically mixed together in order to prepare a composite positive active material represented by the formula $LiNi_{0.85}Co_{0.10}Mn_{0.05}O_2$.

The nickel sulfate, the cobalt sulfate, and the manganese sulfate were dissolved in distilled water to obtain a 2 molar (M) precursor mixture. After $NH_4OH$ as a chelating agent and $NaOH$ as a precipitating agent were added to the precursor mixture, continuous co-precipitation reaction was performed at a pH of about 11.5 and about 50° C. to obtain a precipitate represented by the formula $Ni_{0.85}Co_{0.10}Mn_{0.05}(OH)_2$.

This precipitate ($Ni_{0.85}Co_{0.10}Mn_{0.05}(OH)_2$) was washed with distilled water and then dried at about 80° C. for about 24 hours. About 50 grams (g) of the dried precipitate ($Ni_{0.85}Co_{0.10}Mn_{0.05}(OH)_2$) was mixed with 23.58 g of lithium hydroxide ($LiOH \cdot H_2O$) and 2.71 g of manganese nitrate (($Mn(NO_3)_2 \cdot 4H_2O$). The resulting mixture was thermally treated under oxygen atmosphere at about 750° C. for about 12 hours for melt-impregnation reaction, thus to obtain a composite positive active material represented by the formula $0.98LiNi_{0.85}Co_{0.10}Mn_{0.05}O_2 \cdot 0.02Li_2MnO_3$.

Preparation Example 2

Preparation of Composite Positive Active Material

A composite positive active material represented by the formula $0.95LiNi_{0.85}Co_{0.10}Mn_{0.05}O_2 \cdot 0.05Li_2MnO_3$ was prepared in the same manner as in Preparation Example 1, except that the amounts of the nickel sulfate, cobalt sulfate, manganese sulfate, and manganese nitrate were appropriately varied to obtain the composite positive active material including about 5 mole percent (mol %) of $Li_2MnO_3$, based on a total moles of the composite positive active material.

Preparation Example 3

Preparation of Composite Positive Active Material

A composite positive active material represented by the formula $0.9LiNi_{0.85}Co_{0.10}Mn_{0.05}O_2 \cdot 0.1Li_2MnO_3$ was prepared in the same manner as in Preparation Example 1, except that the amounts of the nickel sulfate, cobalt sulfate, manganese sulfate, and manganese nitrate were appropriately varied to obtain the composite positive active material including about 10 mol % of $Li_2MnO_3$.

Preparation Example 4

Preparation of Composite Positive Active Material

A composite positive active material represented by $0.8LiNi_{0.85}Co_{0.10}Mn_{0.05}O_2 \cdot 0.2Li_2MnO_3$ was prepared in the same manner as in Preparation Example 1, except that the amounts of the nickel sulfate, cobalt sulfate, manganese sulfate, and manganese nitrate were appropriately varied to obtain the composite positive active material including about 20 mol % of $Li_2MnO_3$.

Preparation Example 5

Preparation of Composite Positive Active Material

A composite positive active material represented by the formula $0.98LiNi_{0.80}Co_{0.10}Mn_{0.10}O_2 \cdot 0.02Li_2MnO_3$ was prepared in the same manner as in Preparation Example 1, except that the amounts of the nickel sulfate, cobalt sulfate, and manganese sulfate were varied in an appropriate stoichiometric ratio.

Preparation Example 6

Preparation of Composite Positive Active Material

A composite positive active material represented by $0.98LiNi_{0.75}Co_{0.20}Mn_{0.05}O_2 \cdot 0.02Li_2MnO_3$ was prepared in the same manner as in Preparation Example 1, except that the amounts of the nickel sulfate, cobalt sulfate, and manganese sulfate were varied in an appropriate stoichiometric ratio.

Preparation Example 7

Preparation of Composite Positive Active Material

A composite positive active material represented by $0.98LiNi_{0.90}Co_{0.05}Mn_{0.05}O_2 \cdot 0.02Li_2MnO_3$ was prepared in the same manner as in Preparation Example 1, except that the amounts of the nickel sulfate, cobalt sulfate, and manganese sulfate were varied in an appropriate stoichiometric ratio.

Preparation Example 8

Preparation of Composite Positive Active Material

A composite positive active material represented by $0.95LiNi_{0.80}Co_{0.10}Mn_{0.10}O_2 \cdot 0.05Li_2MnO_3$ was prepared in the same manner as in Preparation Example 5, except that the amounts of the nickel sulfate, cobalt sulfate, manganese sulfate, and manganese nitrate were appropriately varied to obtain the composite positive active material including about 5 mol % of $Li_2MnO_3$.

Preparation Example 9

Preparation of Composite Positive Active Material

A composite positive active material represented by $0.9LiNi_{0.80}Co_{0.10}Mn_{0.10}O_2 \cdot 0.1Li_2MnO_3$ was prepared in the same manner as in Preparation Example 5, except that the amounts of the nickel sulfate, cobalt sulfate, manganese sulfate, and manganese nitrate were appropriately varied to obtain the composite positive active material including about 10 mol % of $Li_2MnO_3$.

Preparation Example 10

Preparation of Composite Positive Active Material

A composite positive active material represented by $0.8LiNi_{0.80}Co_{0.10}Mn_{0.10}O_2 \cdot 0.2Li_2MnO_3$ was prepared in the same manner as in Preparation Example 5, except that the amounts of the nickel sulfate, cobalt sulfate, manganese sulfate, and manganese nitrate were appropriately varied to obtain the composite positive active material including about 20 mol % of $Li_2MnO_3$.

Preparation Example 11

Preparation of Composite Positive Active Material

A composite positive active material represented by $0.95LiNi_{0.75}Co_{0.20}Mn_{0.05}O_2 \cdot 0.05Li_2MnO_3$ was prepared in the same manner as in Preparation Example 6, except that the amounts of the nickel sulfate, cobalt sulfate, manganese sulfate, and manganese nitrate were appropriately varied to obtain the composite positive active material including about 5 mol % of $Li_2MnO_3$.

Preparation Example 12

Preparation of Composite Positive Active Material

A composite positive active material represented by $0.9LiNi_{0.75}Co_{0.20}Mn_{0.05}O_2 \cdot 0.1Li_2MnO_3$ was prepared in the same manner as in Preparation Example 6, except that the amounts of the nickel sulfate, cobalt sulfate, manganese sulfate, and manganese nitrate were appropriately varied to obtain the composite positive active material including about 10 mol % of $Li_2MnO_3$.

Preparation Example 13

Preparation of Composite Positive Active Material

A composite positive active material represented by $0.8LiNi_{0.75}Co_{0.20}Mn_{0.05}O_2 \cdot 0.2Li_2MnO_3$ was prepared in the same manner as in Preparation Example 6, except that the amounts of the nickel sulfate, cobalt sulfate, manganese sulfate, and manganese nitrate were appropriately varied to obtain the composite positive active material including about 20 mol % of $Li_2MnO_3$.

Preparation Example 14

Preparation of Composite Positive Active Material

A composite positive active material represented by $0.95LiNi_{0.90}Co_{0.05}Mn_{0.05}O_2 \cdot 0.05Li_2MnO_3$ was prepared in the same manner as in Preparation Example 7, except that the amounts of the nickel sulfate, cobalt sulfate, manganese sulfate, and manganese nitrate were appropriately varied to obtain the composite positive active material including about 5 mol % of $Li_2MnO_3$.

Preparation Example 15

Preparation of Composite Positive Active Material

A composite positive active material represented by 0.9 $LiNi_{0.9}Co_{0.05}Mn_{0.05}O_2 \cdot 0.1Li_2MnO_3$ was prepared in the same manner as in Preparation Example 7, except that the amounts of the nickel sulfate, cobalt sulfate, manganese sulfate, and manganese nitrate were appropriately varied to obtain the composite positive active material including about 10 mol % of $Li_2MnO_3$.

Preparation Example 16

Preparation of Composite Positive Active Material

A composite positive active material represented by $0.8LiNi_{0.9}Co_{0.05}Mn_{0.05}O_2 \cdot 0.2Li_2MnO_3$ was prepared in the same manner as in Preparation Example 7, except that the amounts of the nickel sulfate, cobalt sulfate, manganese sulfate, and manganese nitrate were appropriately varied to obtain the composite positive active material including about 20 mol % of $Li_2MnO_3$.

Preparation Example 17

Preparation of Composite Positive Active Material

A composite positive active material was prepared in the same manner as in Preparation Example 1, except that the precipitate $Ni_{0.85}Co_{0.10}Mn_{0.05}(OH)_2$ was mixed with lithium hydroxide ($LiOH \cdot H_2O$) and manganese acetate, instead of manganese nitrate ($Mn(NO_3)_2 \cdot 4H_2O$).

Comparative Preparation Example 1

Preparation of Positive Active Material

A positive active material was synthesized using a co-precipitation method as follows.

A nickel sulfate, a cobalt sulfate, and a manganese sulfate as starting materials were stoichiometrically mixed together in order to prepare a positive active material represented by the formula $LiNi_{0.85}Co_{0.10}Mn_{0.05}O_2$.

The nickel sulfate, the cobalt sulfate, and the manganese sulfate were dissolved in distilled water to obtain a 2M precursor mixture. After $NH_4OH$ as a chelating agent and NaOH as a precipitating agent were added to the precursor mixture, continuous co-precipitation reaction was performed at a pH of about 10.5 to about 12.5 and about 40° C. to 60° C. to obtain a precipitate represented by the formula $Ni_{0.85}Co_{0.10}Mn_{0.05}(OH)_2$.

This precipitate ($Ni_{0.85}Co_{0.10}Mn_{0.05}(OH)_2$) was washed with distilled water and then dried at about 80° C. for about 24 hours. About 50 g of the dried precipitate ($Ni_{0.85}Co_{0.10}Mn_{0.05}(OH)_2$) was mixed with lithium hydroxide ($LiOH \cdot H_2O$) in a stoichiometric ratio in order to obtain the composite positive active material represented by the formula $LiNi_{0.85}Co_{0.10}Mn_{0.05}O_2$.

The resulting mixture was thermally treated under oxygen atmosphere at about 750° C. for about 12 hours to obtain the composite positive active material ($LiNi_{0.85}Co_{0.10}Mn_{0.05}O_2$) as a target product.

Comparative Preparation Example 2

Preparation of Mixture with Positive Active Material

The positive active material ($LiNi_{0.85}Co_{0.10}Mn_{0.05}O_2$) prepared in Comparative Preparation Example 1 was mixed with $Li_2MnO_3$ in a mole ratio of about 99.8:0.02 to obtain a mixture of the positive active material ($LiNi_{0.85}Co_{0.10}Mn_{0.05}O_2$) and $Li_2MnO_3$.

Comparative Preparation Example 3

Preparation of Composite Positive Active Material

A composite positive active material represented by the formula $0.98LiNi_{0.60}Co_{0.20}Mn_{0.20}O_2 \cdot 0.02Li_2MnO_3$ was prepared in the same manner as in Preparation Example 1, except that the amounts of the nickel sulfate, cobalt sulfate, manganese sulfate, and manganese nitrate were appropriately varied to obtain the composite positive active material including about 2 mol % of $Li_2MnO_3$. Comparative Preparation Example 4: Preparation of composite positive active material A composite positive active material represented by the formula $0.7LiNi_{0.85}Co_{0.10}Mn_{0.05}O_2 \cdot 0.3Li_2MnO_3$ was prepared in the same manner as in Preparation Example 1, except that the amounts of the nickel sulfate, cobalt sulfate, manganese sulfate, and manganese nitrate were appropriately varied to obtain the composite positive active material including about 30 mol % of $Li_2MnO_3$.

Example 1

A lithium battery was manufactured as follows using the composite positive active material of Preparation Example 1. The composite positive active material of Preparation Example 1, carbon as a conducting agent (Denka Black), and polyvinylidene fluoride (PVDF) as a binder were uniformly mixed in a weight ratio of about 90:5:5 in a NMP solvent to prepare a slurry.

This slurry was then coated on an aluminum (Al) substrate (thickness: 15 μm) using a doctor blade, dried at about 120° C. under reduced pressure, and then roll-pressed in sheet form, to thereby form a positive electrode.

The positive electrode and a lithium metal as a counter electrode were assembled together, followed by injecting an electrolyte prepared by dissolving 1.3M $LiPF_6$ in a mixed solvent of ethylene carbonate (EC), ethylmethyl carbonate (EMC) and diethyl carbonate (DEC) in a volume ratio of about 3:4:3.

Examples 2 to 17

Lithium batteries were manufactured in the same manner as in Example 1, except that the composite positive active materials of Preparation Examples 2 to 17, instead of the composite positive active material of Preparation Example 1, were used, respectively.

Comparative Examples 1 to 4

Lithium batteries were manufactured in the same manner as in Example 1, except that the positive active materials of Comparative Preparation Examples 1 to 4, instead of the composite positive active material of Preparation Example 1, were used, respectively.

Evaluation Example 1

X-ray Diffraction Analysis

The composite positive active materials of Preparation Examples 1 to 4 and the positive active material of Comparative Preparation Example 1 were analyzed by X-ray diffraction (XRD) analysis using a Rigaku RINT2200HF+ diffractometer with Cu—Kα radiation (1.540598 Å).

Figure 2:
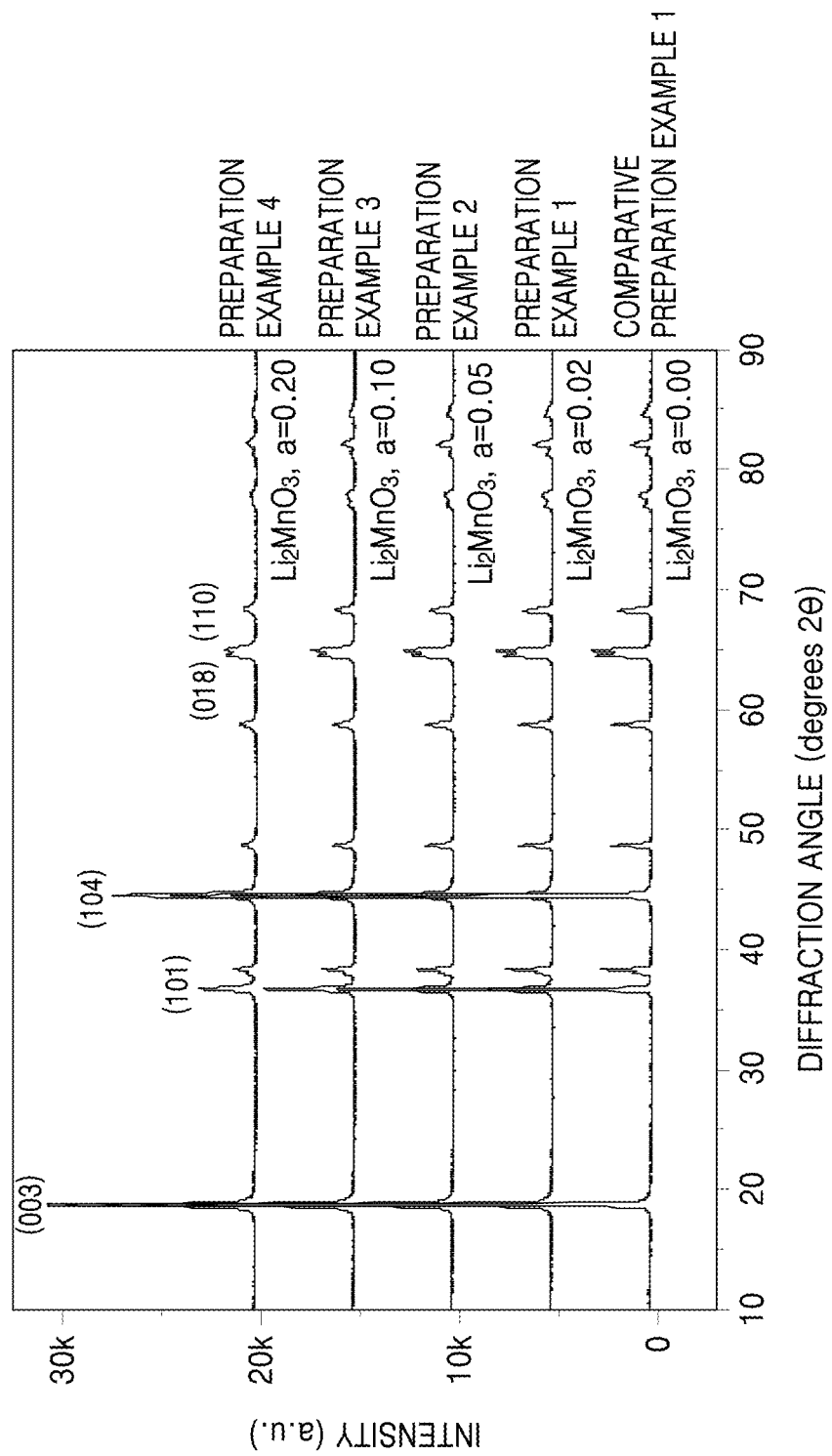
FIG. 2 is a graph of intensity (arbitrary units, a.u.) versus diffraction angle (degrees two-theta, 2θ) and illustrates the results of X-ray diffraction (XRD) analysis on composite positive active materials of Preparation Examples 1 to 4 and a positive active material of Comparative Preparation Example 1.
Figure 3:
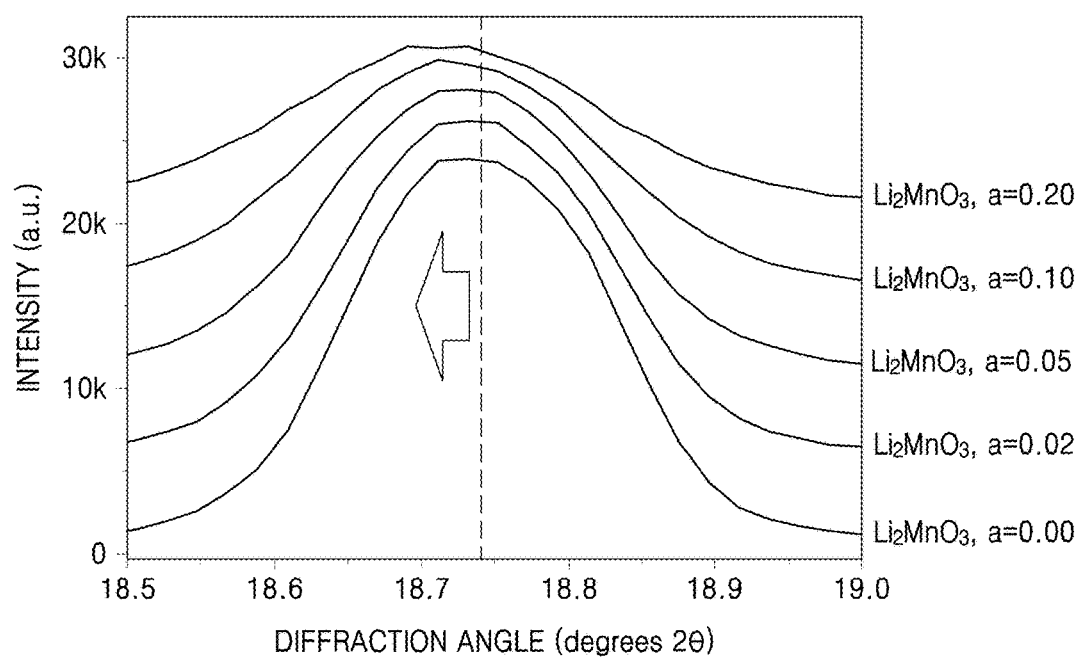
FIG. 3 is an enlarged view of FIG. 2 illustrating the results of the XRD analysis of the (003) plane.
Figure 4A:
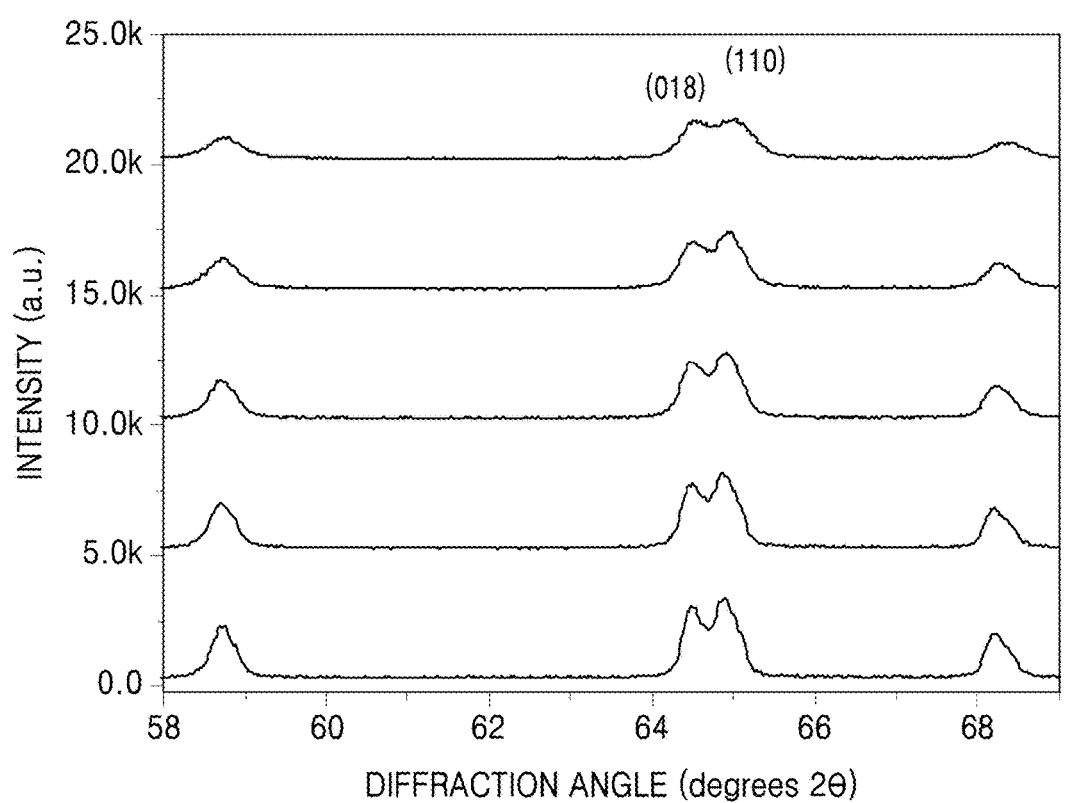
FIG. 4A is an enlarged view of FIG. 2 illustrating the results of the XRD analysis of the (018) and (110) planes.
Figure 4B:
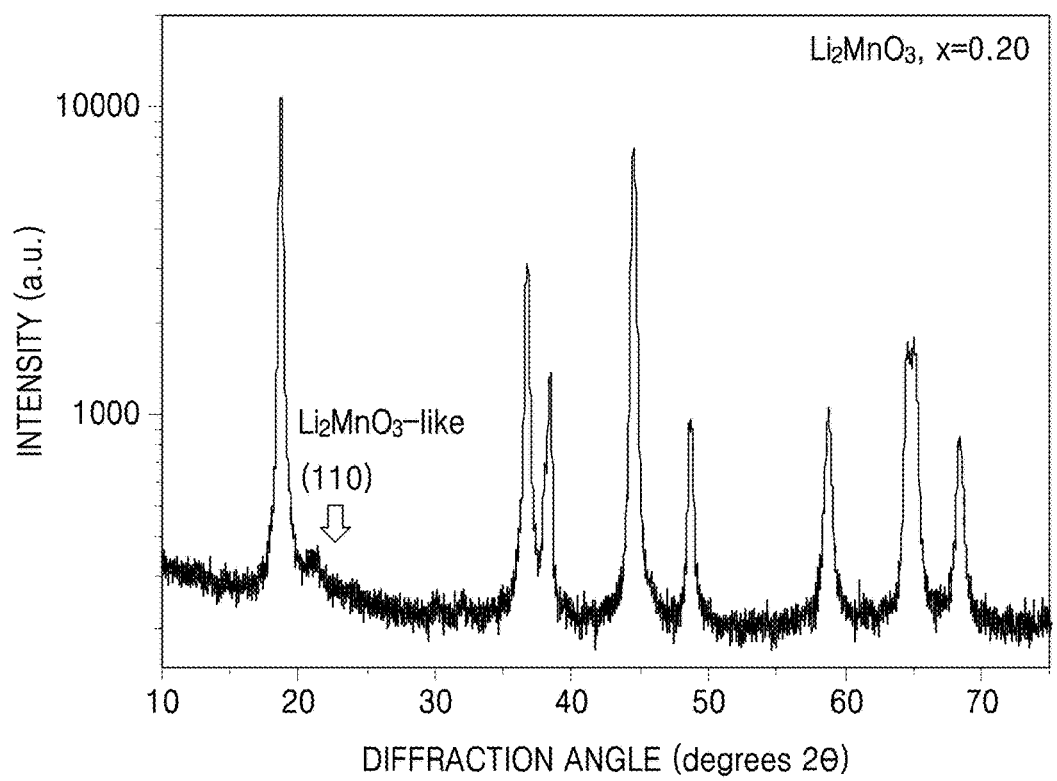
FIG. 4B is an enlarged view of FIG. 2 illustrating the results of the XRD analysis of the (110) plane in the composite positive active material of Preparation Example 4.

The X-ray diffraction analysis results are shown in FIGS. 2, 3, 4A and 4B. FIG. 2 illustrates the results of the X-ray diffraction analysis on the composite positive active materials of Preparation Examples 1 to 4 and the positive active material of Comparative Preparation Example 1. FIGS. 3 and 4A are enlarged graphs of FIG. 2, illustrating the results of the X-ray diffraction at the (003) plane and at the (018) and (110) planes, respectively, in the composite active materials of Preparation Examples 1 to 4 and Comparative Preparation Example 1. FIG. 4B is an enlarged graph of FIG. 2 illustrating the results of the X-ray diffraction at the (110) plane in the composite positive active material of Preparation Example 4.

Referring to FIGS. 2 and 3, in the composite positive active materials of Preparation Examples 1 to 4, the larger the amount of $Li_2MnO_3$ became, the (003) peak was shifted more toward a low angle, with an increased full width at half maximum (FWHM) of the (003) plane peak, due to an effect of the composite composition.

The FWHMs of the (003) plane peak in the composite positive active materials of Preparation Examples 1 to 4 and the positive active material of Comparative Preparation Example 1 are shown in Table 1.

TABLE 1

| Example | 2theta (2θ, degree) | FWHM (°) |
|---|---|---|
| Preparation Example 1 | 18.7014 | 0.1968 |
| Preparation Example 2 | — | 0.2165 |
| Preparation Example 3 | 18.7034 | 0.2362 |
| Preparation Example 4 | 18.7001 | 0.2362 |
| Comparative Preparation Example 1 | 18.6931 | 0.1969 |

Referring to Table 1, the composite positive active materials of Preparation Examples 1, 3, and 4 were found to have a (003) plane peak that was shifted more toward a low angle, compared to that of the positive active material of Comparative Preparation Example 1. The composite positive active materials of Preparation Examples 1 to Preparation Example 4 were found to have an increased FWHM of the (003) plane peak, compared to that of the positive active material of Comparative Preparation Example 1. Referring to FIG. 4A, the composite positive active material of Preparation Example 4 including about 20 mole % of $Li_2MnO_3$ was found to have a (110) plane peak of $Li_2MnO_3$ appearing near about 20-25°.

Evaluation Example 2

Scanning Electron Microscopy (SEM)

The composite positive active materials of Preparation Examples 1 to 4 and the positive active material of Comparative Preparation Example 1 were analyzed by scanning electron microscopy (SEM).

The SEM results are shown in FIGS. 5A to 5E.

Figure 5A:
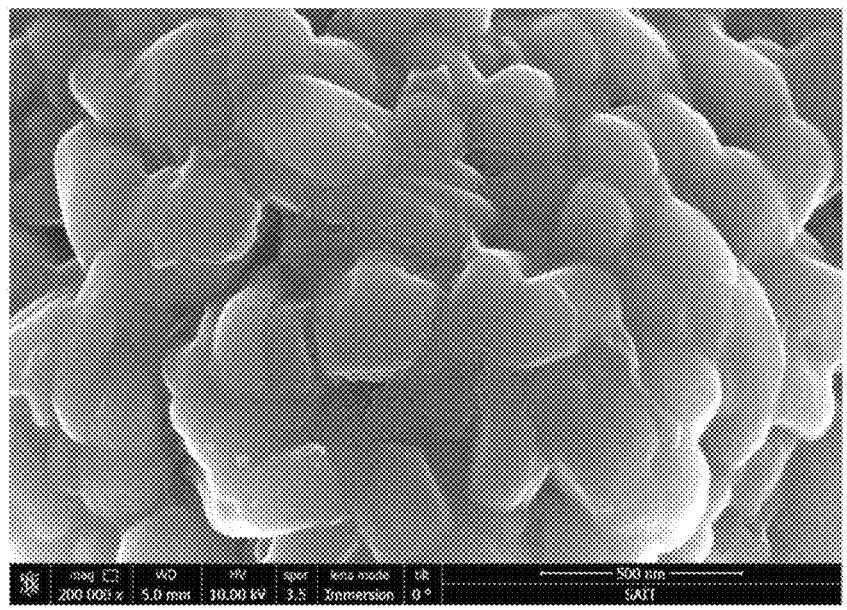
FIGS. 5A to 5E are scanning electron microscopic (SEM) images of the composite positive active materials of Preparation Examples 1 to 4 and the positive active material of Comparative Preparation Example 1, respectively.
Figure 5B:
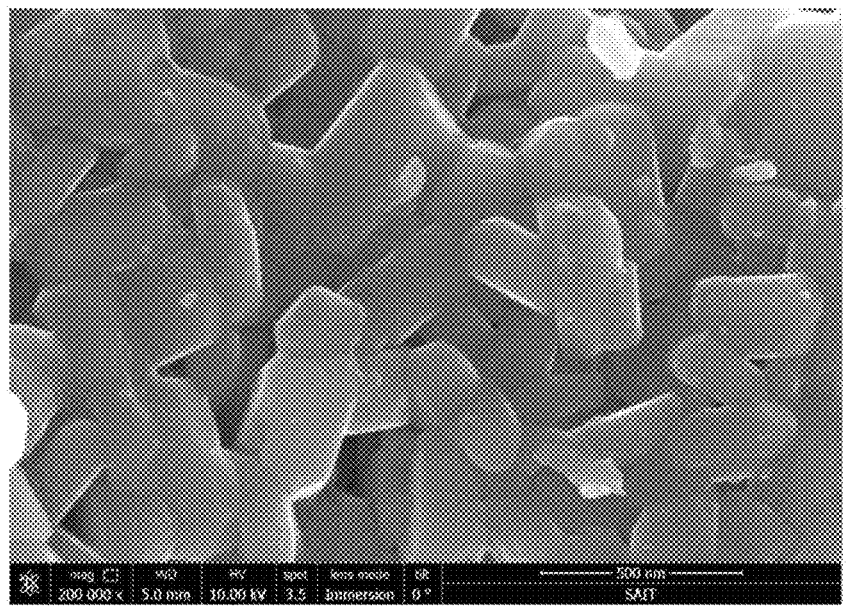
Figure 5C:
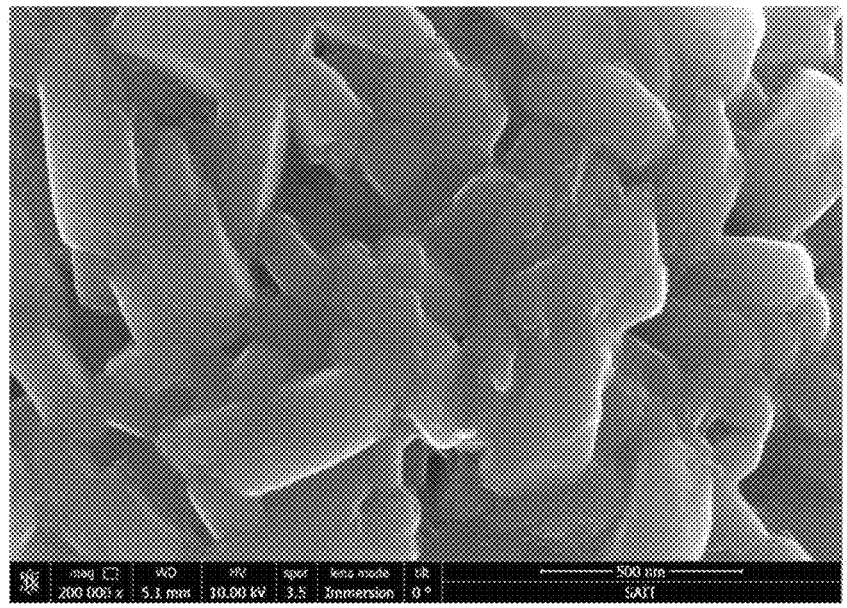
Figure 5D:
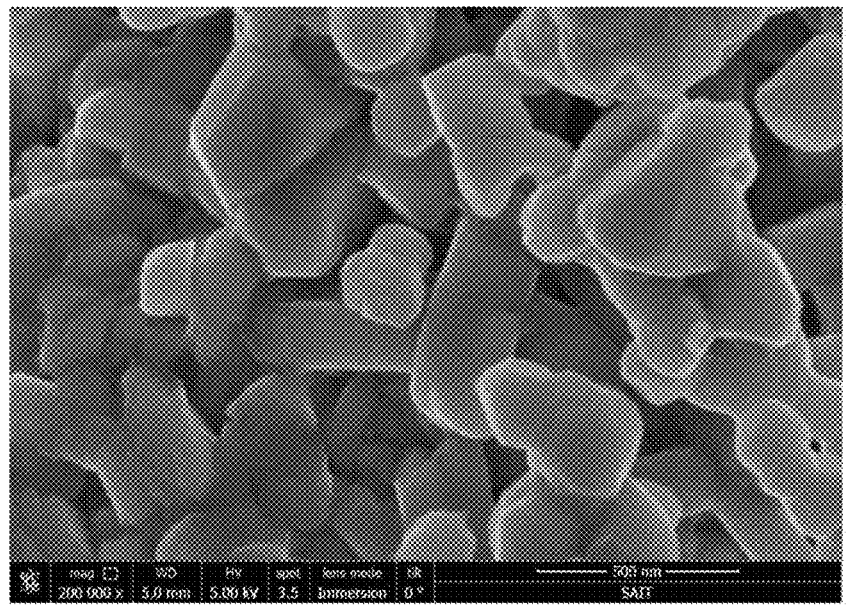
Figure 5E:
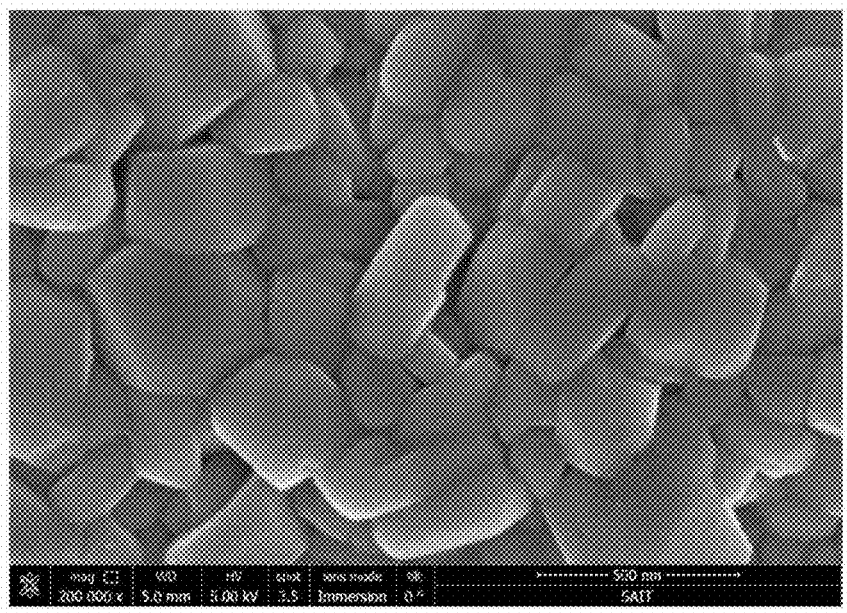

Referring to FIGS. 5A to 5E, the composite positive active materials of Preparation Examples 1 to 4 were found to be not significantly different in primary particle size, compared to the positive active material of Comparative Preparation Example 1 shown in FIG. 5E, and have a nearly same primary particle size of about 300 nm. The primary particle size refers to a longer axis diameter of a particle.

Evaluation Example 3

Electron Probe Microanalysis (EPMA)

The composite positive active material of Preparation Example 3 and the positive active material of Comparative Preparation Example 1 were analyzed using an electron probe microanalyzer (EPMA, JXA-8630F, available from JEOL) by which the atomic ratio was measured while moving a probe from the center of each sample toward the surface thereof.

Figure 6A:
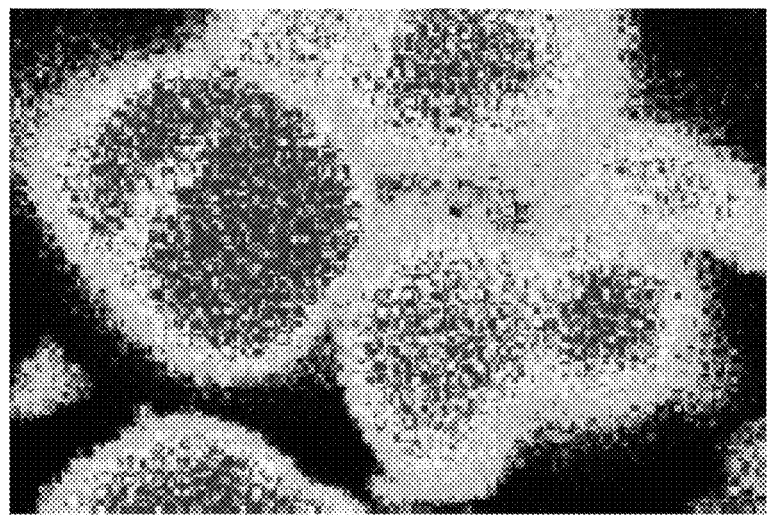
FIGS. 6A to 6C illustrate the results of electron probe microanalysis (EPMA) of the composite active material of Preparation Example 3 and show the results of measuring the atomic ratio of nickel, cobalt and manganese, respectively, while moving a probe of an electron probe microanalyzer from a center of the composite positive active material of Preparation Example 3 to a surface thereof.
Figure 6B:
Figure 6C:
Figure 6D:
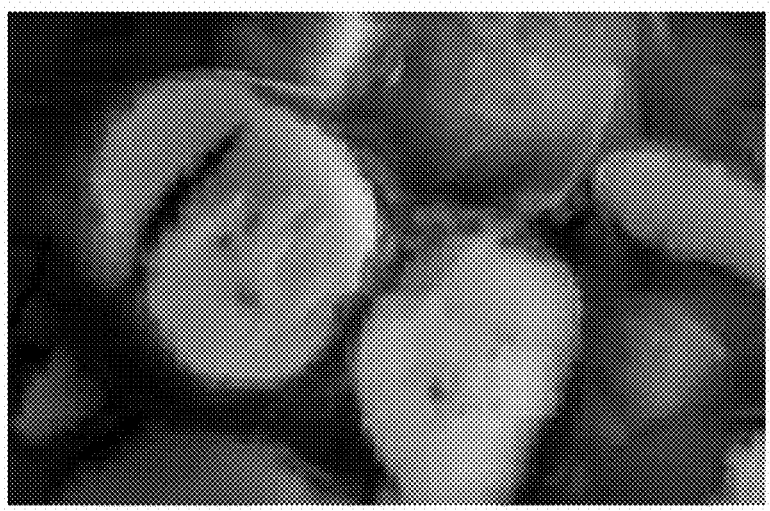
FIG. 6D is a cross-sectional SEM image of the composite positive active material of Preparation Example 3.
Figure 7A:
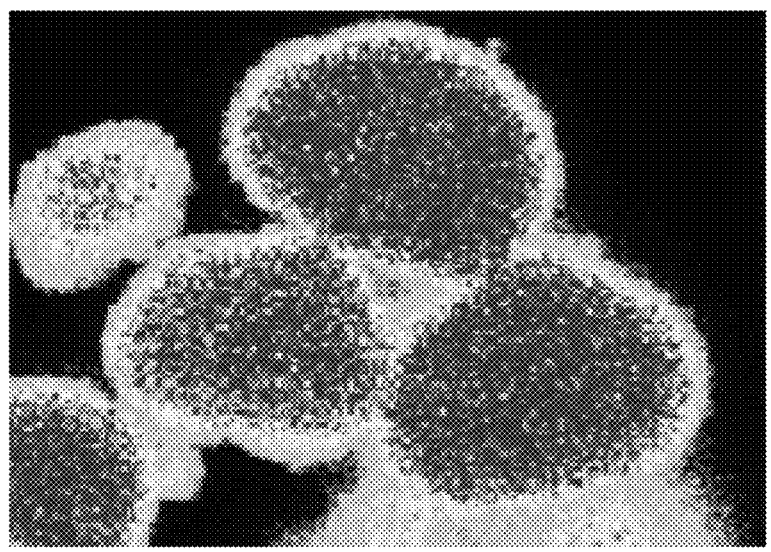
FIGS. 7A to 7C illustrate the results of EPMA analysis of the positive active material of Comparative Preparation Example 1 and show the results of measuring the atomic ratio of nickel, cobalt and manganese, respectively while moving a probe of an electron probe microanalyzer from the center of the positive active material of Comparative Preparation Example 1 to the surface thereof.
Figure 7B:
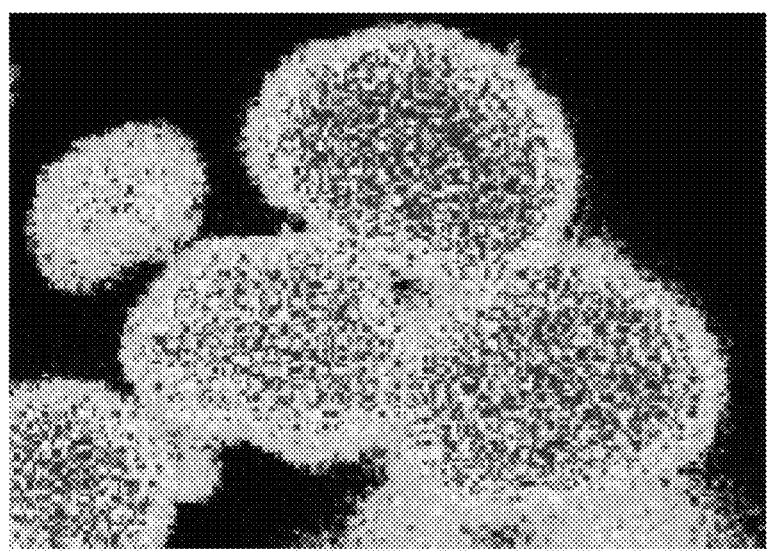
Figure 7C:
Figure 7D:
FIG. 7D is a cross-sectional SEM image of the composite positive active material of Comparative Preparation Example 1.

FIGS. 6A to 6C illustrate the EPMA images of the composite active material of Preparation Example 3 as the results of measuring the atomic ratio of nickel, cobalt and manganese while moving the probe of the electron probe microanalyzer from the center of the composite positive active material of Preparation Example 3 to the surface thereof. As shown in FIG. 6C, it is found that manganese originating from manganese nitrate may form a composite structure through melt impregnation into particles of the composite positive active material. FIGS. 7A to 7C illustrate the EPMA images of the positive active material of Comparative Preparation Example 1 as the results of measuring the atomic ratio of nickel, cobalt and manganese while moving the probe of the electron probe microanalyzer from the center of the positive active material of Comparative Preparation Example 1 to the surface thereof. FIGS. 6D and 7D are cross-sectional SEM images of the composite positive active material of Preparation Example 3 and the positive active material of Comparative Preparation Example 1, respectively.

Evaluation Example 4

Evaluation of Residual Lithium Content

The amounts of residual lithium in the composite positive active materials of Preparation Examples 1 to 3 and the positive active material of Comparative Preparation Examples 1, 2, and 4 were measured using the following method.

Figure 9:
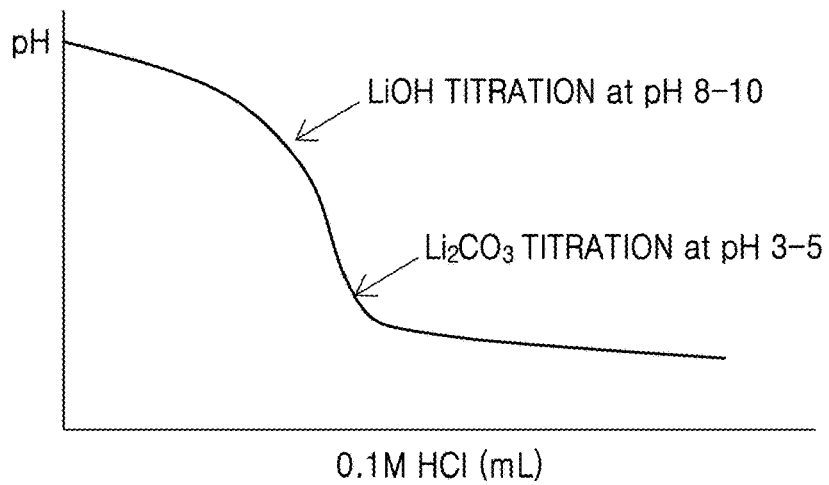
FIG. 9 is an HCl-titration graph of pH versus amount of 0.1 M HCl (milliliters, mL) used for measuring the amount of residual lithium in positive active materials.

About 100 g of deionized water was added to 10 g of each sample and then stirred at about 250 revolutions per minute (rpm) for about 30 minutes, followed by filtration and titration with a 0.1M HCl aqueous solution. Two inflection points appear after the titration, as shown in FIG. 9, wherein the amount of residual lithium was calculated based on the added amounts of the HCl aqueous solution at the two inflection points.

Figure 8:
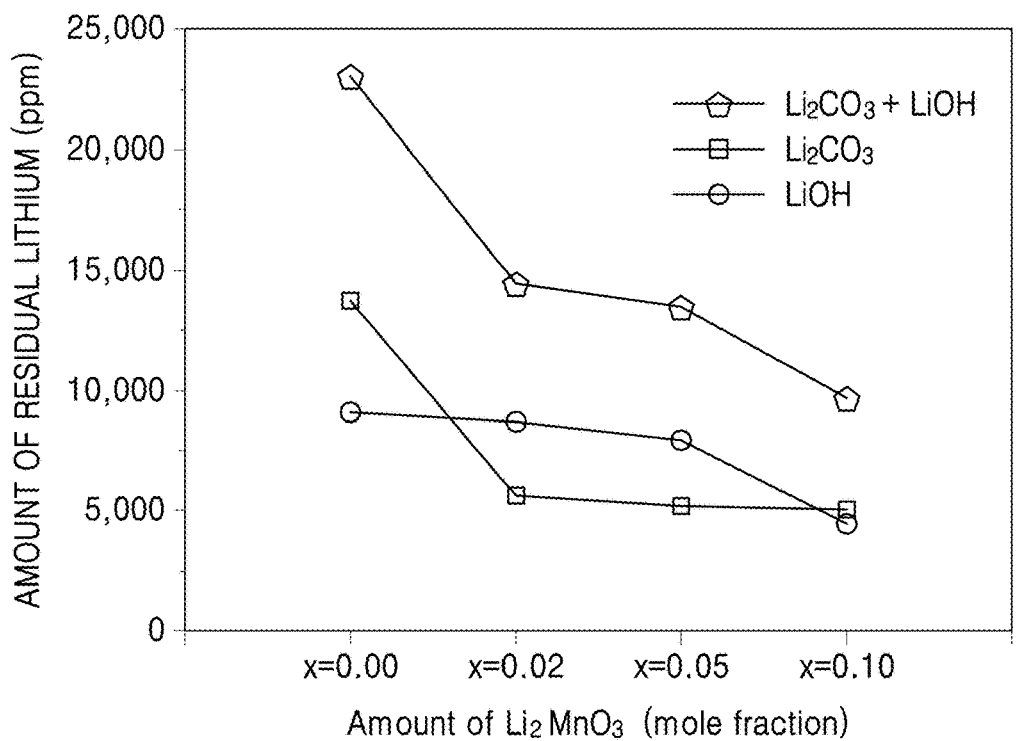
FIG. 8 is a graph of the amount of residual lithium (parts per million, ppm) versus the content of Li$_2$MnO$_3$ (mole fraction, based on a total moles of the composite positive active material) in the composite positive active materials of Preparation Examples 1 to 3 and the positive active material of Comparative Preparation Example 1.

The amounts of LiOH and $Li_2CO_3$ measured according to the above-described method are shown in Table 2 and FIG. 8.

TABLE 2

| Example | $Li_2MnO_3$ content | Amount of $Li_2CO_3$ (wt %) | Amount of LiOH (wt %) | Amount of Free Li (ppm) |
|---|---|---|---|---|
| Preparation Example 1 | x = 0.02 | 0.591 | 0.866 | 14,571 |
| Preparation Example 2 | x = 0.05 | 0.537 | 0.801 | 13,382 |
| Preparation Example 3 | x = 0.10 | 0.535 | 0.446 | 9,810 |
| Comparative Preparation Example 1 | x = 0.00 | 1.372 | 0.918 | 22,899 |

Referring to Table 2 and FIG. 8, the composite positive active materials of Preparation Examples 1 to 3 were found to have a smaller amount of residual lithium than that of the positive active material of Comparative Preparation Example 1, indicating a significant reduction in the amount of lithium carbonate in the surface of the composite positive active materials of Preparation Examples 1 to 3.

The results of measuring the amounts of residual lithium in the positive active materials of Comparative Preparation Examples 2 and 4 are as follows.

As a result of measuring the amount of residual lithium in the positive active material of Comparative Preparation Example 4, the positive active material of Comparative Preparation Example 4 had an equivalent amount of residual lithium to that of the composite positive active material of Preparation Example 1.

The positive active materials of Comparative Preparation Examples 2 and 4 had nearly the same or similar amount of residual lithium as that of the positive active material of Comparative Preparation Example 1.

As a result of measuring the amount of residual lithium in the composite positive active material of Preparation Example 17, the composite positive active material of Preparation Example 17 had an equivalent amount of residual lithium to that of the composite positive active material of Preparation Example 1.

Evaluation Example 5

Charge-discharge Characteristics

Charge-discharge characteristics of the lithium batteries of Examples 1 to 4 and Comparative Examples 1 to 4 were evaluated after a first charging and discharging cycle, a second charging and discharging cycle, and repeated (cyclic) charging and discharging at about 25° C.

Each of the lithium batteries of Examples 1 to 4 and Comparative Example 1 was charged with a constant current of 0.1 C to about 4.7V and then discharged with a constant current of 0.1 C to about 2.5V (First cycle), and was charged, from the second cycle, in a constant current and constant voltage (CC/CV) mode at 0.5 C and 4.6V, and then discharged at 0.2 C/1 C/2 C to 2.5V. This charging and discharging cycle was repeated 50 times, wherein charging with a constant current of 1 C to 4.6V was followed by discharging with 1 C to 2.5V.

The C rate for current means a current which will discharge a battery in one hour, e.g., a C rate for a battery having a discharge capacity of 1.6 ampere-hours would be 1.6 amperes.

The initial efficiency, rate capability, discharge voltage decay, and capacity retention rate of a lithium battery are defined by Equations 1 to 4, respectively. An initial discharge capacity refers to a discharge capacity after $1^{st}$ cycle of charging and discharging.

$$\text{Initial efficiency} = \{(1^{st} \text{ cycle discharge capacity})/(1^{st} \text{ cycle charge capacity})\} \times 100\% \quad \text{Equation 1}$$

$$\text{Rate capability} = \{(2 \text{ C Discharge capacity})/(0.2 \text{ C Discharge capacity})\} \times 100\% \quad \text{Equation 2}$$

$$\text{Discharge voltage decay[mV]} = [50^{th} \text{ cycle average discharge voltage} - 1^{st} \text{ cycle average discharge voltage}] \quad \text{Equation 3}$$

In Equation 3, the average discharge voltage refers to a discharge voltage corresponding to an intermediate level of the discharge voltage at each cycle.

$$\text{Capacity retention rate[\%]} = [50^{th} \text{ cycle discharge capacity}/1^{st} \text{ cycle discharge capacity}] \times 100\% \quad \text{Equation 4}$$

The results of evaluating the charge-discharge characteristics of the lithium batteries of Examples 1 to 4 and Comparative Example 1, initial efficiencies and rate capabilities of the lithium batteries are shown in Table 3. The results of evaluating the charge-discharge characteristics of the lithium batteries of Examples 1 to 6 and Comparative Examples 1 and 3, capacity retention rates and discharge voltage decays of the lithium batteries are shown in Table 4. A discharge voltage decay refers to a difference between the discharge voltage after $50^{th}$ cycle and the discharge voltage after $1^{st}$ cycle.

TABLE 3

| | $1^{st}$ cycle | | | |
|---|---|---|---|---|
| Example | 0.1 C Charge capacity | 0.1 C Discharge capacity | Initial efficiency (%) | Rate capability 2 C/0.2 C (%) |
| Example 1 | 235 | 225 | 95.9 | 90.6 |
| Example 2 | 221 | 211 | 95.2 | 89.4 |
| Example 3 | 211 | 199 | 94.4 | 87.0 |
| Example 4 | 195 | 178 | 91.1 | 88.0 |
| Comparative Example 1 | 240 | 230 | 95.8 | 91.4 |

TABLE 4

| | Average voltage (V) | | Discharge voltage decay (Δ) (mV) | Lifetime ($50^{th}$ cycle) (%) |
|---|---|---|---|---|
| Example | After $1^{st}$ cycle | After $50^{th}$ cycle | | |
| Example 1 | 3.821 | 3.795 | −25 | 91.9 |
| Example 2 | 3.829 | 3.808 | −22 | 96.0 |
| Example 3 | 3.826 | 3.807 | −18 | 95.5 |
| Example 4 | 3.831 | 3.808 | −23 | 92.5 |
| Comparative Example 1 | 3.828 | 3.788 | −40 | 91.0 |

Referring to Table 3, the lithium batteries of Examples 1 to 4, each having a positive electrode including a $Li_2MnO_3$-containing composite positive active material, were found to be slightly lower in initial efficiency and rate capability, compared to those of the lithium battery of Comparative Preparation Example 1.

Referring to Table 4, the lithium batteries of Examples 1 to 4 exhibited improved lifetime characteristics and an improvement in discharge voltage decay, compared to those of the lithium battery of Comparative Example 1.

As a result of evaluating lifetime characteristics and discharge voltage decay, the lithium battery of Comparative Example 2 was found to be poorer in lifetime characteristics and discharge voltage decay, compared to those of the lithium batteries of Examples 2 to 4.

The lithium batteries of Comparative Examples 3 and 4 had reduced overall cell performance, including discharge capacity, compared to that of the lithium batteries of Examples 1 to 3.

As described above, according to the one or more embodiments, a composite positive active material including a first metal oxide of Formula 1 and a second metal oxide may have a reduced amount of lithium and suppress a side reaction during charging and discharging, thus improving structural stability of a lithium battery. A high power-output and high-capacity lithium battery having improved lifetime characteristics and a reduced discharge voltage decay even under repeated charging and discharging may be manufactured using a positive electrode including the composite positive active material.

It should be understood that embodiments described herein should be considered in a descriptive sense only and not for purposes of limitation. Descriptions of features or aspects within each embodiment should be considered as available for other similar features or aspects in other embodiments.

While an embodiment has been described with reference to the figures, it will be understood by those of ordinary skill in the art that various changes in form and details may be made therein without departing from the spirit and scope of the disclosure.

What is claimed is:

1. A composite positive active material comprising:
a composite comprising:
    a first metal oxide that is a compound represented by Formula 1 and having a layered structure, and
    a second metal oxide having a crystal structure that is a layered structure, a perovskite structure, a rock salt structure, or a spinel structure;
    wherein a content of the second metal oxide is greater than 0 and equal to or less than 0.2 moles per mole of the composite, and
    wherein the composite positive active material has an amount of residual lithium between 5,000 parts per million by weight to 14,6000 parts per million by weight, based on a total weight of the composite positive active material, $$LiNi_xM^1{}_{1-x}O_{2-e}M^a{}_e \qquad \text{Formula 1}$$

wherein, in Formula 1,
M$^1$ is a Group 4 to Group 14 element of the Periodic Table of the Elements, or a combination thereof;
M$^a$ is F, S, Cl, Br, or a combination thereof;
0.7≤x<1; and
0≤e<1.

2. The composite positive active material of claim 1, wherein the amount of residual lithium in the composite positive active material is 9,810 parts per million by weight to 14,571 parts per million by weight, based on a total weight of the composite positive active material.

3. The composite positive active material of claim 1, wherein M$^1$ in Formula 1 is manganese, vanadium, chromium, iron, cobalt, nickel, zirconium, rhenium, aluminum, boron, germanium, ruthenium, tin, titanium, niobium, molybdenum, platinum, or a combination thereof.

4. The composite positive active material of claim 1, wherein the first metal oxide is a compound represented by Formula 2, $$LiNi_xCo_yMn_zM^3{}_cO_{2-e}M^a{}_e \qquad \text{Formula 2}$$

wherein, in Formula 2, 0.7≤x≤0.99; 0≤y<1; 0<z<1; 0≤c<1, 0<x+y+z+c≤1; 0≤e<1;
M$^3$ is a Group 4 to Group 14 element of the Periodic Table of the Elements, or a combination thereof; and
M$^a$ is F, S, Cl, Br, or a combination thereof.

5. The composite positive active material of claim 1, wherein the first meal oxide is a compound represented by Formula 3:

$$LiNi_xCo_yMn_zO_2 \qquad \text{Formula 3}$$

wherein, in Formula 3, 0.7≤x≤0.99; 0<y<1; 0<z<1; and 0<x+y+z+c≤1.

6. The composite positive active material of claim 1, wherein the second metal oxide is a compound represented by Formula 4, a compound represented by Formula 5, a compound represented by Formula 6, or a compound represented by Formula 7, $$A_2M^2O_3, \qquad \text{Formula 4}$$

$$AM^2O_3, \qquad \text{Formula 5}$$

$$(A_bM^2{}_{1-b})O, \text{ or} \qquad \text{Formula 6}$$

$$AM^2{}_2O_4, \qquad \text{Formula 7}$$

wherein, in Formulae 4 to 7,
A is a Group 1 to Group 3 element of the Periodic Table of the Elements, or a combination thereof;
M$^2$ is a Group to Group 16 element of the Periodic Table of the Elements, a rare earth element, or a combination thereof; and
0≤b≤1.

7. The composite positive active material of claim 6, wherein, in Formulae 4 to 7, A is Li, Na, Sr, Ba, H, K, Ca, Y, or a combination thereof; and M$^2$ is Al, Ga, Ge, Mg, Nb, Zn, Cd, Ti, Co, Ni, Mn, Ca, Si, Fe, Cu, Sn, V, B, P, Se, Bi, As, Zr, Re, Ru, Cr, Sr, Sc, Y, or a combination thereof.

8. The composite positive active material of claim 6, wherein the compound represented by Formula 4 is Li$_2$MnO$_3$, Li$_2$TiO$_3$, Li$_2$SnO$_3$, Li$_2$ZrO$_3$, Li$_2$MoO$_3$, or Li$_2$RuO$_3$.

9. The composite positive active material of claim 6, wherein the compound represented by Formula 5 is a compound represented by Formula 8, $$(A^1{}_{1-a}A^2{}_a)M^1O_3 \qquad \text{Formula 8}$$

wherein, in Formula 8,
A$^1$ is La, Sr, Ba, Ce, Y, Se, or a combination thereof;
A$^2$ is Li, Na, Ca, Ag, K, Mg, Cu, or a combination thereof;
M$^1$ is Mn, V, Cr, Fe, Co, Ni, Zr, Ti, Mg, Cu, Nb, Ta, Ru, W, Sn, or a combination thereof; and
0<a≤0.3.

10. The composite positive active material of claim 6, wherein the compound represented by Formula 6 is (Li$_b$Ni$_{1-b}$)O, (Li$_b$Co$_{1-b}$)O, (Li$_b$Fe$_{1-b}$)O, (Li$_b$Cu$_{1-b}$)O, (Li$_b$Zn$_{1-b}$)O, (Li$_b$Ca$_{1-b}$)O, (Li$_b$Sr$_{1-b}$)O, (Li$_b$Mg$_{1-b}$)O, or (Li$_b$Cr$_{1-b}$)O), wherein each b is independently selected and is 0≤b≤1.

11. The composite positive active material of claim 6, wherein the compound represented by Formula 7 is LiMn$_2$O$_4$, LiNi$_{0.5}$Mn$_{1.5}$O$_4$, LiCo$_{0.5}$Mn$_{1.5}$O$_4$, Li[Co$_f$Ni$_g$Mn$_h$]$_2$O$_4$, or Li[Cu$_c$Mn$_{2-c}$]$_2$O$_4$, wherein 0<c≤2, 0<f≤2, 0<g≤2, 0<h≤2, and f+g+h=2.

12. The composite positive active material of claim 1, wherein the composite positive active material is a compound represented by Formulae 9 to 12, or a combination thereof, $$(1-a)LiNi_xM^1{}_{1-x}O_2 \cdot aA_2M^2O_3, \quad \text{Formula 9}$$

$$(1-a)LiNi_xM^1{}_{1-x}O_2 \cdot aAM^2O_3, \quad \text{Formula 10}$$

$$(1-a)LiNi_xM^1{}_{1-x}O_2 \cdot a(A_bM^2{}_{1-b})O, \text{ and} \quad \text{Formula 11}$$

$$(1-a)LiNi_xM^1{}_{1-x}O_2 \cdot aAM^2{}_2O_4, \quad \text{Formula 12}$$

wherein, in Formulae 9 to 12,
A is Li, Na, La, Sr, Ba, H, K, Ca, Y, or a combination thereof;
$M^2$ is Al, Ga, Ge, Mg, Nb, Zn, Cd, Ti, Co, Ni, Mn, Ca, Si, Fe, Cu, Sn, V, B, P, Se, Bi, As, Zr, Re, Ru, Cr, Sr, Sc, Y, a rare earth element, or a combination thereof; $0 < a \le 0.2$; and $0 < b \le 1$.

13. The composite positive active material of claim 1, wherein the composite positive active material is a compound represented by Formulae 9-1 to 12-1, or a combination thereof, $$(1-a)LiNi_xCo_yMn_zO_2 \cdot aLi_2MnO_3, \quad \text{Formula 9-1}$$

$$(1-a)LiNi_xCo_yMn_zO_2 \cdot aLiMnO_3, \quad \text{Formula 10-1}$$

$$(1-a)LiNi_xCo_yMn_zO_2 \cdot a(Li_bLa_{1-b})MnO_3, \quad \text{Formula 10-2}$$

$$(1-a)LiNi_xCo_yMn_zO_2 \cdot a(Li_bLa_{1-b})O, \quad \text{Formula 11-1}$$

$$(1-a)LiNi_xCo_yMn_zO_2 \cdot aLiMn_2O_4, \quad \text{Formula 12-1}$$

wherein, in Formulae 9-1 to 12-2, $0.7 \le x \le 0.99$, $0 < y \le 0.3$, $0 < z \le 0.3$, $x+y+z=1$, $0 < b \le 1$, and $0 < a \le 0.2$.

14. The composite positive active material of claim 13, wherein, in Formulae 9-1 to 12-1, $LiNi_xCo_yMn_zO_2$ is $LiNi_{0.85}Co_{0.10}Mn_{0.05}O_2$, $LiNi_{0.8}Co_{0.1}Mn_{0.1}O_2$, $LiNi_{0.75}Co_{0.20}Mn_{0.05}O_2$, or $LiNi_{0.9}Co_{0.05}O_2$, or a combination thereof.

15. The composite positive active material of claim 1, wherein the second metal oxide is intermixed in the layered structure of the first metal oxide.

16. The composite positive active material of claim 1, wherein the composite positive active material is
$0.98LiNi_{0.85}Co_{0.10}Mn_{0.05}O_2 \cdot 0.02Li_2MnO_3$,
$0.95LiNi_{0.85}Co_{0.10}Mn_{0.05}O_2 \cdot 0.05Li_2MnO_3$,
$0.9LiNi_{0.85}Co_{0.10}Mn_{0.05}O_2 \cdot 0.1Li_2MnO_3$,
$0.8LiNi_{0.85}Co_{0.10}Mn_{0.05}O_2 \cdot 0.2Li_2MnO_3$,
$0.98LiNi_{0.8}Co_{0.1}Mn_{0.1}O_2 \cdot 0.02Li_2MnO_3$,
$0.95LiNi_{0.8}Co_{0.1}Mn_{0.1}O_2 \cdot 0.05Li_2MnO_3$,
$0.9LiNi_{0.8}Co_{0.1}Mn_{0.1}O_2 \cdot 0.1Li_2MnO_3$,
$0.8LiNi_{0.8}Co_{0.1}Mn_{0.1}O_2 \cdot 0.2Li_2MnO_3$,
$0.98LiNi_{0.75}Co_{0.20}Mn_{0.05}O_2 \cdot 0.02Li_2MnO_3$,
$0.95LiNi_{0.75}Co_{0.20}Mn_{0.05}O_2 \cdot 0.05Li_2MnO_3$,
$0.9LiNi_{0.75}Co_{0.20}Mn_{0.05}O_2 \cdot 0.1Li_2MnO_3$,
$0.8LiNi_{0.75}Co_{0.20}Mn_{0.05}O_2 \cdot 0.2Li_2MnO_3$,
$0.98LiNi_{0.9}Co_{0.05}Mn_{0.05}O_2 \cdot 0.02Li_2MnO_3$,
$0.95LiNi_{0.9}Co_{0.05}Mn_{0.05}O_2 \cdot 0.05Li_2MnO_3$,
$0.9LiNi_{0.9}Co_{0.05}Mn_{0.05}O_2 \cdot 0.1Li_2MnO_3$, or
$0.8LiNi_{0.8}Co_{0.05}Mn_{0.05}O_2 \cdot 0.2Li_2MnO_3$.

17. The composite positive active material of claim 1, wherein, when evaluated by X-ray diffraction analysis with Cu—Kα radiation, a diffraction peak measured at a 2 theta value of 18.5° to 19.0° has a full width at half maximum of 0.1968° to 0.2362°.

18. The composite positive active material of claim 1, wherein a half cell having a positive element including the composite positive active material and lithium metal as a counter electrode has an average discharge voltage of 92.5% to 99.95% after a $50^{th}$ charging and discharging cycle, with respect to the average discharge voltage after a $1^{st}$ charging and discharging cycle.

19. The composite positive active material of claim 1, wherein the composite positive active material has a surface comprising the second metal oxide.

20. The composite positive active material of claim 1, wherein the composite positive active material further comprises a coating layer on a surface thereof, and wherein the coating layer is a conductive material, a metal oxide, an inorganic fluoride, or a combination thereof.

21. The composite positive active material of claim 20, wherein the conductive material is a carbonaceous material, indium tin oxide, $RuO_2$, ZnO, or a combination thereof.

22. The composite positive active material of claim 20, wherein the metal oxide is silica, alumina, zirconium oxide, titanium oxide, or a combination thereof.

23. The composite positive active material of claim 20, wherein the coating layer comprises an inorganic fluoride, and wherein the inorganic fluoride is $AlF_3$CsF, KF, LiF, NaF, RbF, TiF, AgF, $AgF_2$, $BaF_2$, $CaF_2$, $CuF_2$, $CdF_2$, $FeF_2$, $HgF_2$, $Hg_2F_2$, $MnF_2$, $MgF_2$, $NiF_2$, $PbF_2$, $SnF_2$, $SrF_2$, $XeF_2$, $ZuF_2$, $AlF_3$, $BF_3$, $BiF_3$, $CeF_3$, $CrF_3$, $DyF_3$, $EuF_3$, $GaF_3$, $GdF_3$, $FeF_3$, $HoF_3$, $InF_3$, $LaF_3$, $LuF_3$, $MnF_3$, $NdF_3$, $VOF_3$, $PrF_3$, $SbF_3$, $ScF_3$, $SmF_3$, $TbF_3$, $TiF_3$, $TmF_3$, $YF_3$, $YbF_3$, $CeF_4$, $GeF_4$, $HfF_4$, $SiF_4$, $TiF_4$, $VF_4$, $ZrF_4$, $NbF_5$, $SbF_5$, $TaF_5$, $BiF_5$, $MoF_6$, $ReF_6$, $SF_6$, $WF_6$, or a combination thereof.

24. A positive electrode comprising the composite positive active material of claim 1.

25. A lithium battery comprising the positive electrode of claim 24.

* * * * *